United States Patent [19]
Adams et al.

[11] Patent Number: 5,542,438
[45] Date of Patent: Aug. 6, 1996

[54] SMOKELESS ASHTRAY SYSTEM

[75] Inventors: Terry Adams, Coconut Creek; Neil J. Ambrosio, Sunrise; William E. Bratton, Boca Raton, all of Fla.; William M. Forsythe, Fountain Valley, Calif.; Bruce E. Hatton, San Diego, Calif.; Larry L. Kinder, Sunnyvale, Calif.; William A. Swat, Delray Beach, Fla.

[73] Assignee: Progressive Games, Inc., Fort Lauderdale, Fla.

[21] Appl. No.: 230,645

[22] Filed: Apr. 21, 1994

Related U.S. Application Data

[63] Continuation-in-part of Ser. No. 208,467, Mar. 9, 1994, which is a continuation-in-part of Ser. No. 37,895, Mar. 26, 1993, Pat. No. 5,361,784.

[51] Int. Cl.⁶ .................................................. B01D 50/00
[52] U.S. Cl. ...................... 131/238; 155/385.8; 155/471; 155/472
[58] Field of Search .................................. 131/231, 238; 55/385.8, 472, 471

[56] References Cited

U.S. PATENT DOCUMENTS

| | | |
|---|---|---|
| 991,263 | 5/1911 | Bajluk . |
| 1,030,116 | 6/1912 | Noga . |
| 1,105,362 | 7/1914 | Mayer . |
| 1,615,729 | 1/1927 | Thompson . |
| 1,992,450 | 2/1935 | Sporman . |
| 2,299,668 | 10/1942 | Webster ................................ 206/19.5 |
| 2,461,815 | 2/1949 | Gill ...................................... 206/19.5 |
| 2,559,178 | 7/1951 | Thompson . |
| 2,616,557 | 11/1952 | Gill . |
| 2,675,122 | 4/1954 | Minnie . |
| 2,716,464 | 8/1955 | Weisbecker . |
| 2,754,145 | 7/1956 | Mackey . |
| 2,764,281 | 9/1956 | Mendenhall . |
| 2,829,766 | 4/1958 | Gill . |
| 2,874,702 | 2/1959 | Walker et al. . |
| 2,962,181 | 11/1960 | Nelson . |
| 3,011,627 | 12/1961 | Frost . |
| 3,113,665 | 12/1963 | Frost . |
| 3,648,837 | 3/1972 | Ogle . |
| 3,663,432 | 5/1972 | Ellison . |

(List continued on next page.)

FOREIGN PATENT DOCUMENTS

| | | |
|---|---|---|
| 1074084 | 3/1953 | France . |
| 2327330 | 5/1973 | Germany . |
| 2806623 | 2/1978 | Germany . |
| 362883 | 8/1929 | United Kingdom . |

*Primary Examiner*—Vincent Millin
*Assistant Examiner*—Charles Anderson

[57] ABSTRACT

A smokeless ashtray system includes a vacuum manifold connecting a plurality of ashtrays to a charcoal filter and a vacuum blower/motor assembly. The vacuum manifold includes spiral wound metal flexible metal tubing segments secured to connectors by heat shrink tubing. L connectors connect end most ashtray locations to the manifold, T connectors connect intermediate ashtray locations, and a four-way connector connects a central ashtray location to the manifold and to the charcoal filter and blower/motor assembly. Each ashtray location includes a flue member having a first end threaded into the associated connector and a second end inserted within a recess formed centrally in a bottom surface of a cup-shaped ashtray. A connector mounting bracket includes locating apertures engaging alignment pins extending from a flat upper surface of the connector, and a flange on the flue member clamps the bracket to the connector. Screws secure mounting flanges of the bracket to the underside of a table or other mounting surface. A central chimney in the ashtray includes a shield dome covering an open top end to prevent ashes and other debris from entering the air flow path. A replaceable disposable coalescing filter element in the flue member filters smoke prior to passage into the manifold, thus substantially reducing tar fouling of the system. A control box includes an on/off switch, a power on LED, and a service needed LED activated by monitoring load on the motor to indicate filter clogging.

20 Claims, 26 Drawing Sheets

U.S. PATENT DOCUMENTS

| | | |
|---|---|---|
| 3,683,938 | 8/1972 | Rowland . |
| 3,797,205 | 3/1974 | Weisskopk . |
| 4,043,776 | 8/1977 | Orel ............................................ 131/238 |
| 4,061,149 | 12/1977 | Raczowki . |
| 4,119,419 | 10/1978 | Passaro et al. ............................ 55/212 |
| 4,161,181 | 7/1979 | Nicks et al. . |
| 4,550,738 | 11/1985 | Estey . |
| 4,597,784 | 7/1986 | Albrecht et al. .......................... 55/378 |
| 4,623,367 | 11/1986 | Paulson . |
| 4,643,204 | 2/1987 | Ford . |
| 4,671,300 | 6/1987 | Grube et al. ............................. 131/231 |
| 4,883,224 | 11/1989 | Sun ......................................... 232/43.1 |
| 4,906,261 | 3/1990 | Mohajer . |
| 5,167,576 | 12/1992 | Hoek . |
| 5,230,720 | 7/1993 | Kendall . |
| 5,259,400 | 11/1993 | Bruno et al. ............................. 131/238 |
| 5,361,784 | 11/1994 | Kinder .................................... 131/231 |

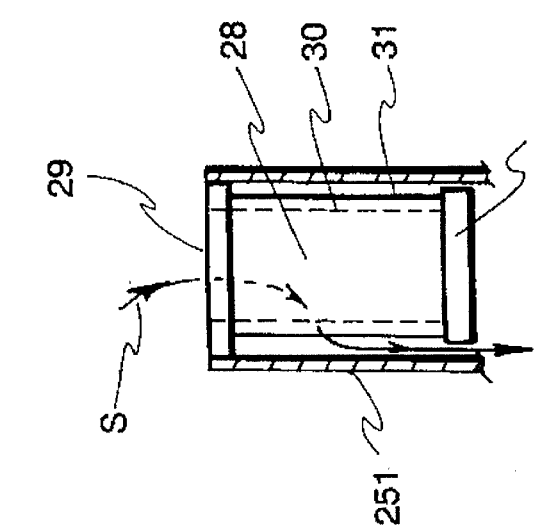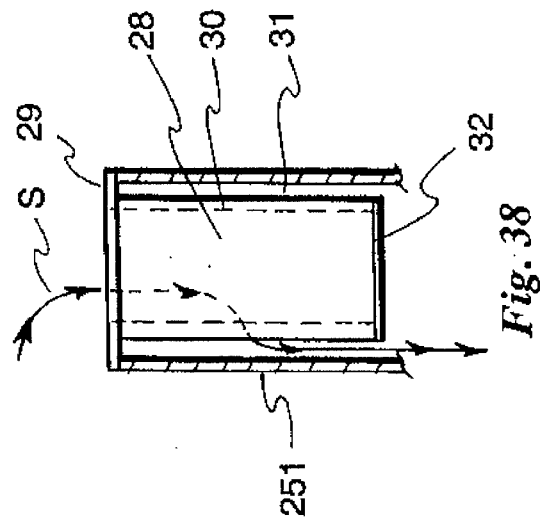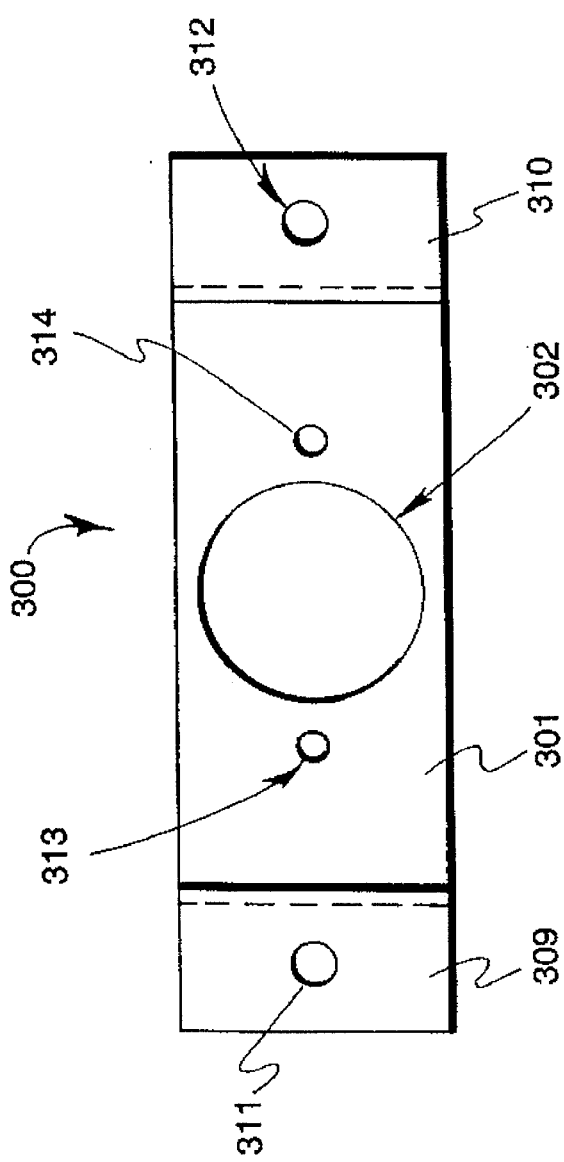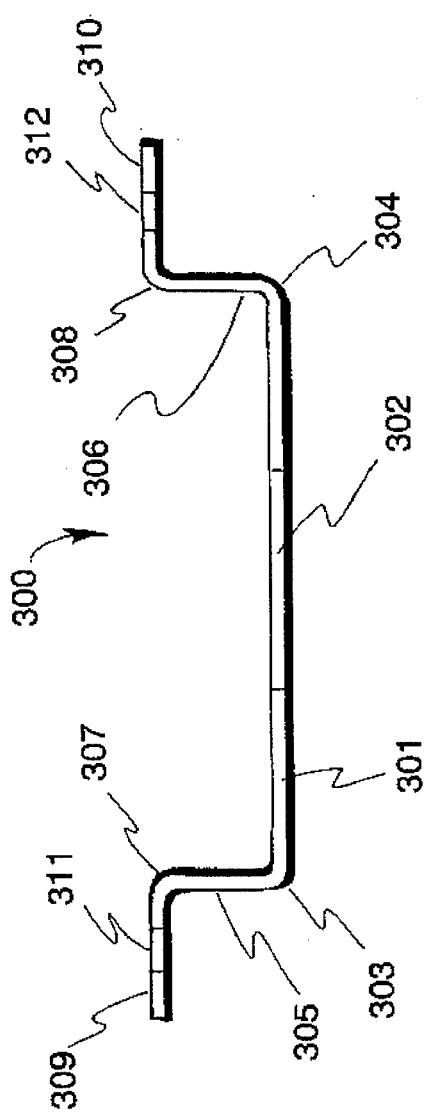

SMOKELESS ASHTRAY SYSTEM

CROSS-REFERENCE TO RELATED APPLICATIONS

This application is a continuation-in-part of U.S. patent application Ser. No. 08/208,467, filed Mar. 9, 1994 for "SYSTEM FOR EXHAUSTING SMOKE PRODUCED BY SMOKING ARTICLES SUCH AS CIGARETTES AND CIGARS"; which is a continuation-in-part of U.S. patent application Ser. No. 08/037,895 filed Mar. 26, 1993, now U.S. Pat. No. 5,361,784, "SYSTEM FOR REMOVING AND DISPOSING OF CIGARETTE AND CIGAR SMOKE AND RESIDUES". The entire disclosures of each of the above listed prior copending applications are incorporated herein by reference.

BACKGROUND OF THE INVENTION

1. Field of the Invention

The present invention relates to ashtrays, and more particularly pertains to an improved smokeless ashtray system including a vacuum and filtration system for removing smoke from indoor room environments frequented by cigar and cigarette smokers such as restaurants, casinos, lounges, and bars.

2. Description of the Prior Art

A variety of vacuum and filtration systems have been proposed by the prior art in attempts to address the problems and potential health affects associated with smoking and resulting residues. Such systems have suffered from several disadvantages including difficult, tedious, and frequent maintenance, high initial cost and high maintenance costs, difficulty in installation, and incompatibility with existing structures. In casino applications, the prior art includes the provision of simple stainless steel cup-shaped ashtrays removeably inserted into holes provided in card gaming tables, in conjunction with screen assemblies removeably disposed in the ashtrays.

Many individuals find smoke-filled environments distasteful, and many governmental authorities have already taken steps to ban or order the creation of non-smoking sections in public and private establishments.

SUMMARY OF THE INVENTION

A smokeless ashtray system includes a vacuum manifold assembly for connecting a plurality of ashtrays to a common charcoal filter and vacuum blower/motor assembly. The vacuum manifold includes a plurality of spiral wound metal flexible metal tubing segments secured to connectors by heat shrink tubing. The system employs L connectors for end most ashtray locations on the manifold, T connectors for intermediate ashtray locations on the manifold, and a four-way connector for connecting a central ashtray location and the manifold to the charcoal filter and blower/motor assembly. Each ashtray location includes a flue member having a first end threaded into the associated manifold connector and a second end inserted within a recess formed centrally in a bottom surface of a cup-shaped ashtray and in fluid communication with an upstanding chimney in the ashtry. A connector mounting bracket includes locating apertures engaging alignment pins extending from a flat upper surface of the connector, and a flange on the flue member clamps the bracket to the connector. Screws secure mounting flanges of the bracket to the underside of a table or other mounting surface. The central chimney in the ashtray includes a shield dome covering an open top end to prevent ashes and other debris from entering the air flow path. A replaceable disposable coalescing filter element in the flue member filters smoke prior to passage into the manifold, thus substantially reducing tar fouling of the system. Each ashtray includes a screen and cover assembly including a slide plate for closing the ashtray when not in use. A control box includes an on/off switch, a power on LED, and a service needed LED activated by monitoring load on the motor to indicate filter clogging.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 35 is a top plan view of a connector mounting bracket used in the vacuum manifold conduit assembly of the smokeless ashtray system of the present invention.

FIG. 36 is a side elevational view of the connector mounting bracket used in the vacuum manifold conduit assembly of the smokeless ashtray system of the present invention.

FIG. 37 is a partial longitudinal cross sectional view illustrating a first alternative manner of mounting a coalescing filter element in the flue member of the smokeless ashtray system of the present invention.

FIG. 38 is a partial longitudinal cross sectional view illustrating a second alternative manner of mounting a coalescing filter element in the flue member of the smokeless ashtray system of the present invention.

DETAILED DESCRIPTION OF THE PREFERRED EMBODIMENT(S)

Figure 1:
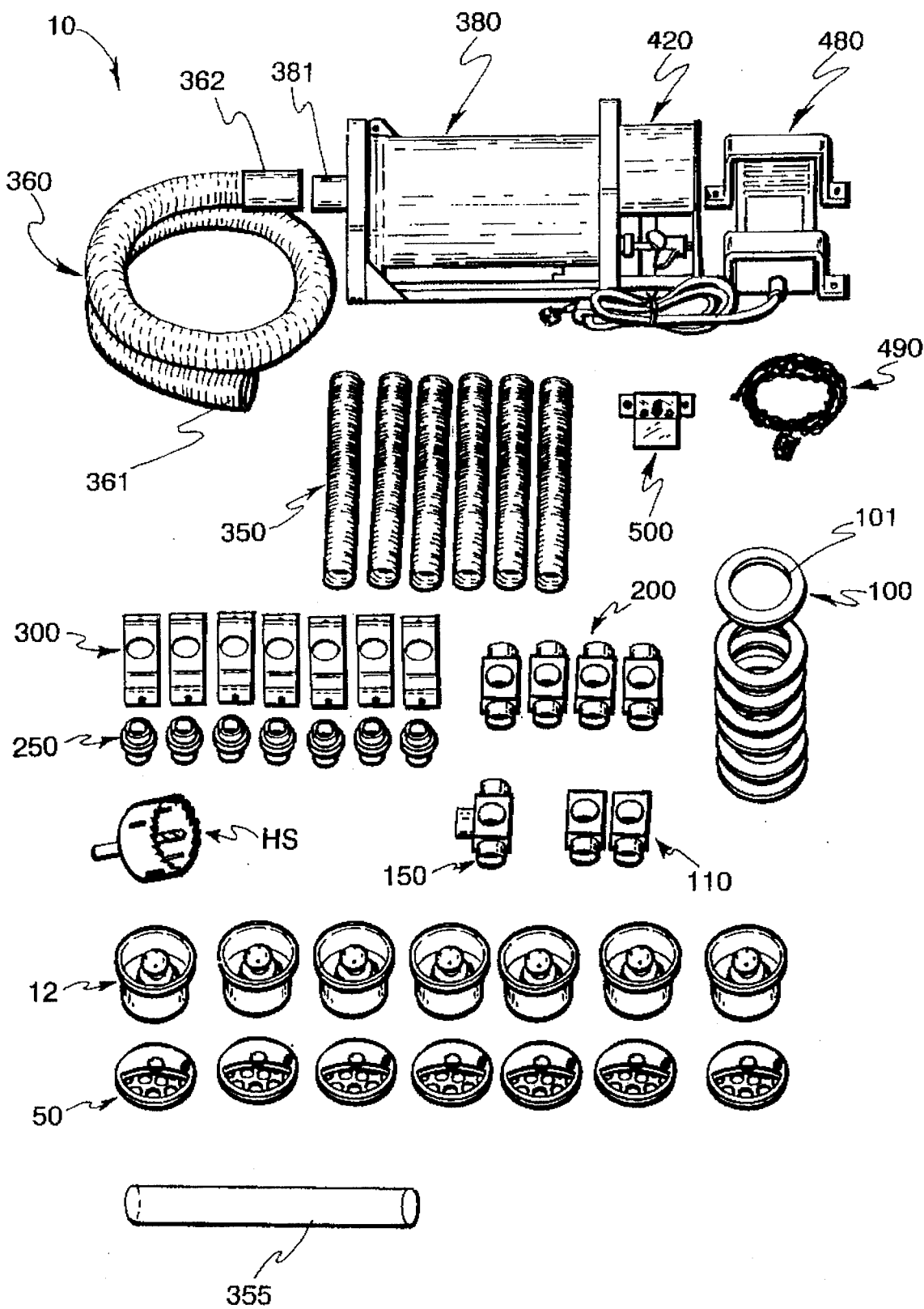
FIG. 1 is a perspective view illustrating the component parts of a kit for installing the smokeless ashtray system of the present invention on a conventional seven-player live casino card gaming table.

Referring now to the drawings, wherein like reference numerals designate corresponding structure throughout the views, and referring in particular to FIG. 1, an improved smokeless ashtray system 10 according to a first preferred embodiment of the invention may be provided in the form of a kit adapted for convenient retrofit installation in a variety of existing structures including bars, tables, counters, casino slot machine bases, and, in the form illustrated in FIG. 1, in live casino card gaming tables of the type utilized in the play of Caribbean Stud (TM) poker, Blackjack or Twenty-One. The system 10 illustrated in FIG. 1 is intended for installation in a seven-player casino gaming table and includes the following major components or subassemblies: seven ashtrays 12, seven ashtray covers 50, seven ashtray trim rings 100, two L vacuum conduit connectors 110, one four-way vacuum conduit connector 150, four T vacuum conduit connectors 200, seven flue members 250, seven vacuum conduit connector mounting brackets 300, six spiral wound flexible vacuum conduit segments 350, heat shrink tubing 355, spiral wound flexible vacuum filter/motor coupling conduit 360, heat shrink connector 362, charcoal filter unit 380, vacuum motor/blower assembly 420, 120 VAC to 12 VDC power supply 480, wiring harness 490, control box 500, and a conventional hole saw HS.

Figure 2:
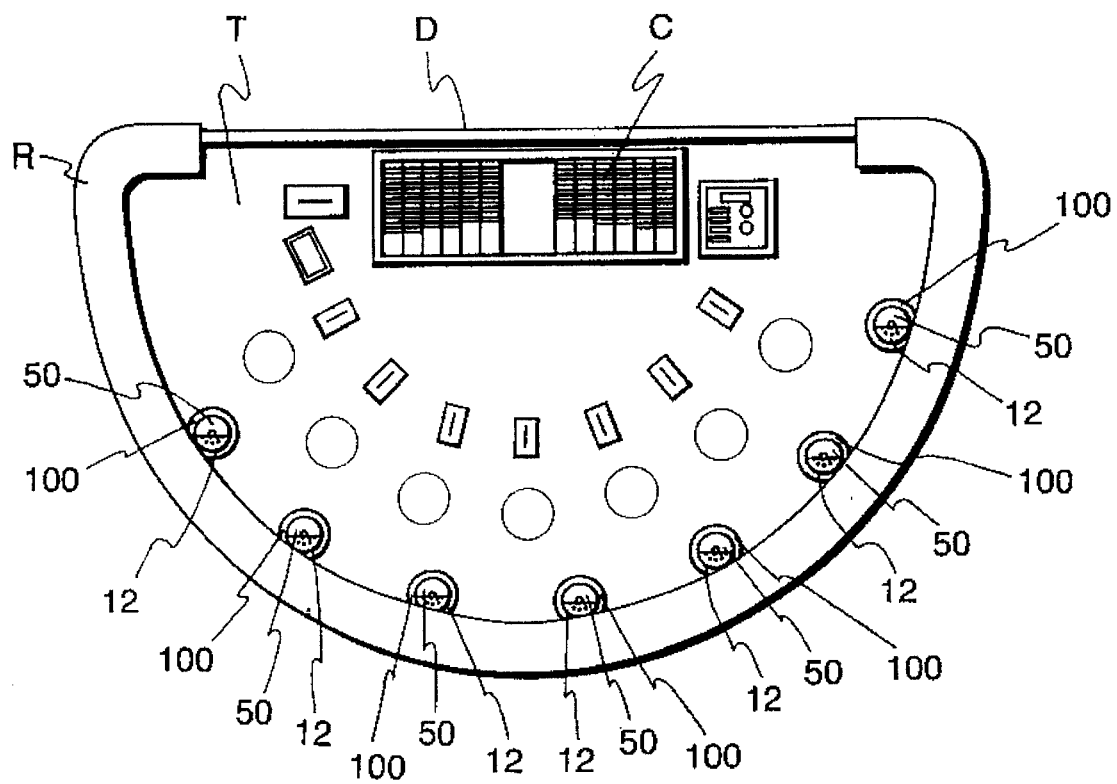
FIG. 2 is a top plan view illustrating the smokeless ashtray system of the present invention installed on a conventional seven-player live casino card gaming table.
Figure 3:
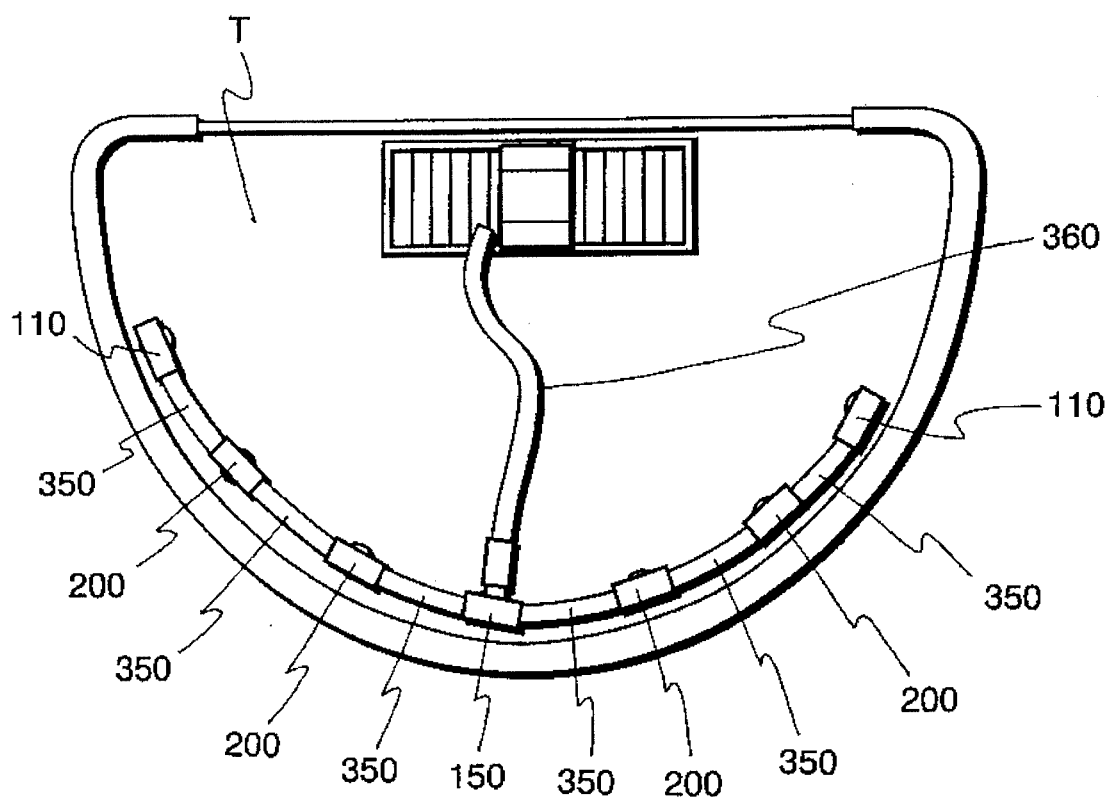
FIG. 3 is a bottom plan view illustrating the vacuum manifold conduit of the smokeless ashtray system of the present invention as installed on a conventional seven-player live casino card gaming table.

With reference to FIGS. 1–3, the manner of installing the system 10 in a conventional casino card gaming table T will now be described. The table T illustrated is of the type having seven player locations spaced around one arcuate side and a chip rack C disposed adjacent an opposite straight edge D where a dealer typically stands. An installation technician first chucks the hole saw HS in a power drill, in a conventional manner, and removes the table top from the supporting base or pedestal. Using a locating template or other technique for measuring and marking preferably uniformly spaced points disposed on a common arc adjacent the padded rail R of the table T, the installation technician drills or cuts seven holes through the table surface dimensioned for insertion of the ashtrays 12. The table T typically comprises a rigid sheet material such as plywood covered by a felt layout sheet suitably marked for the associated card game. The technician then assembles the vacuum conduit manifold on the underside of the table T, as shown in FIG. 3. As identified, the two L vacuum conduit connectors 110 couple the outermost ashtray locations to adjacent conduit segments 350. The T connectors 200 couple the four intermediate ashtray locations to adjacent ashtray locations via additional conduit segments 350. The single four-way connector 150 couples the central ashtray location to the filter/ motor coupling conduit 360 and to the adjacent tubing segments 350. As may now be readily appreciated, the system 10 thus couples a plurality of ashtrays by use of a flexible conduit manifold system. Preferably, each of the conduit segments 350 and 360 comprise a spiral wound, vapor tight, length extensible metal conduit of the type used in some automotive exhaust systems. A suitable conduit material is 1.25 in. I.D. flexible exhaust tubing available from Perfection Automotive of Livonia, Mich. In order to provide air tight connections between the connectors 110, 150, 200 and the conduit segments 350 and 360, short lengths of heat shrink tubing 355 preferably span the locations where the conduit segments 350 insert over the ends of the connectors. A preferred flame retardant heat shrink tubing material for the tubing 355 and the coupling 362 is Low Shrink Temperature (90 degrees C.) Polyolefin FIT 221LT available from Alpha Wire Corporation of Elizabeth, N.J.

After the vacuum manifold has been assembled and attached to the underside of the table, the unitized charcoal filter 380 and motor 420 assembly is secured in a desired location. This might be to the underside of the table or within a hollow table supporting base or pedestal. In any event, suitable fasteners such as screws or bolts secure the filter/ motor assembly in a fixed location. The outlet end of the conduit 360 is then secured to the charcoal filter inlet 381 by heating the heat shrink coupler 362 with a conventional electrical heat gun. The technician then also fastens the power supply 480 and the control box 500 in desired locations, preferably where they will be readily accessible by a dealer disposed adjacent edge D of the table T, but not accessible to players. The technician then connects the motor 420, power supply 480, and control box 500 using a quick connect wiring harness 490.

After reassembly of the table top T on the support base or pedestal, the technician inserts the ashtrays first through the central apertures 101 of the trim rings 100, and then through the holes cut through the table T at each player location. The entire process can be accomplished in about 1.5 hrs. without the need for highly skilled workers.

Figure 4:
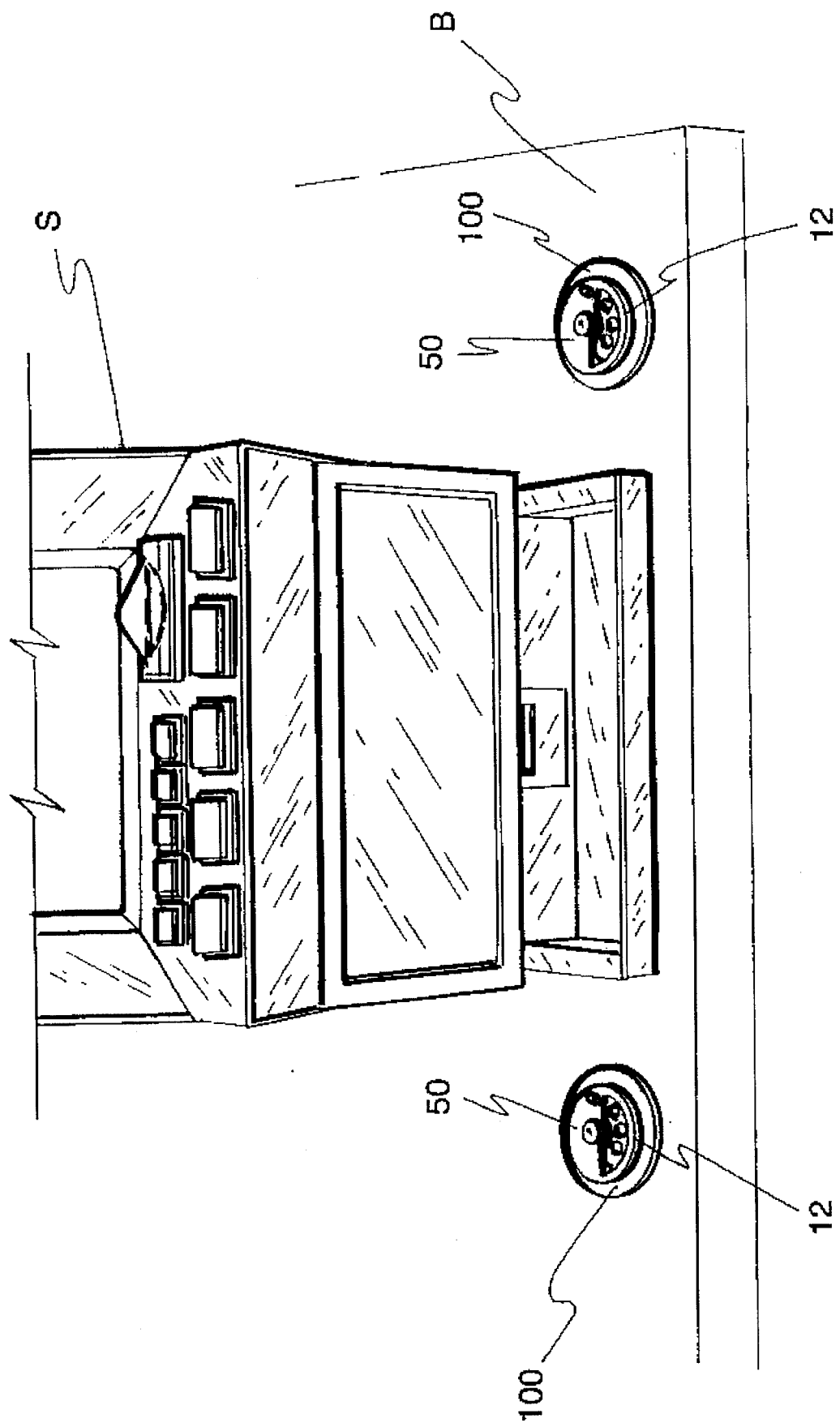
FIG. 4 is a perspective view illustrating the smokeless ashtray system of the present invention installed on a conventional casino slot machine base.

The system 10 may be installed in a variety of other structures, such as bar rails, counter tops, desks, in vehicles such as planes, trains, and busses, and in other casino related structures such as the bases B of slot machines S, as shown in FIG. 4.

Figure 5:
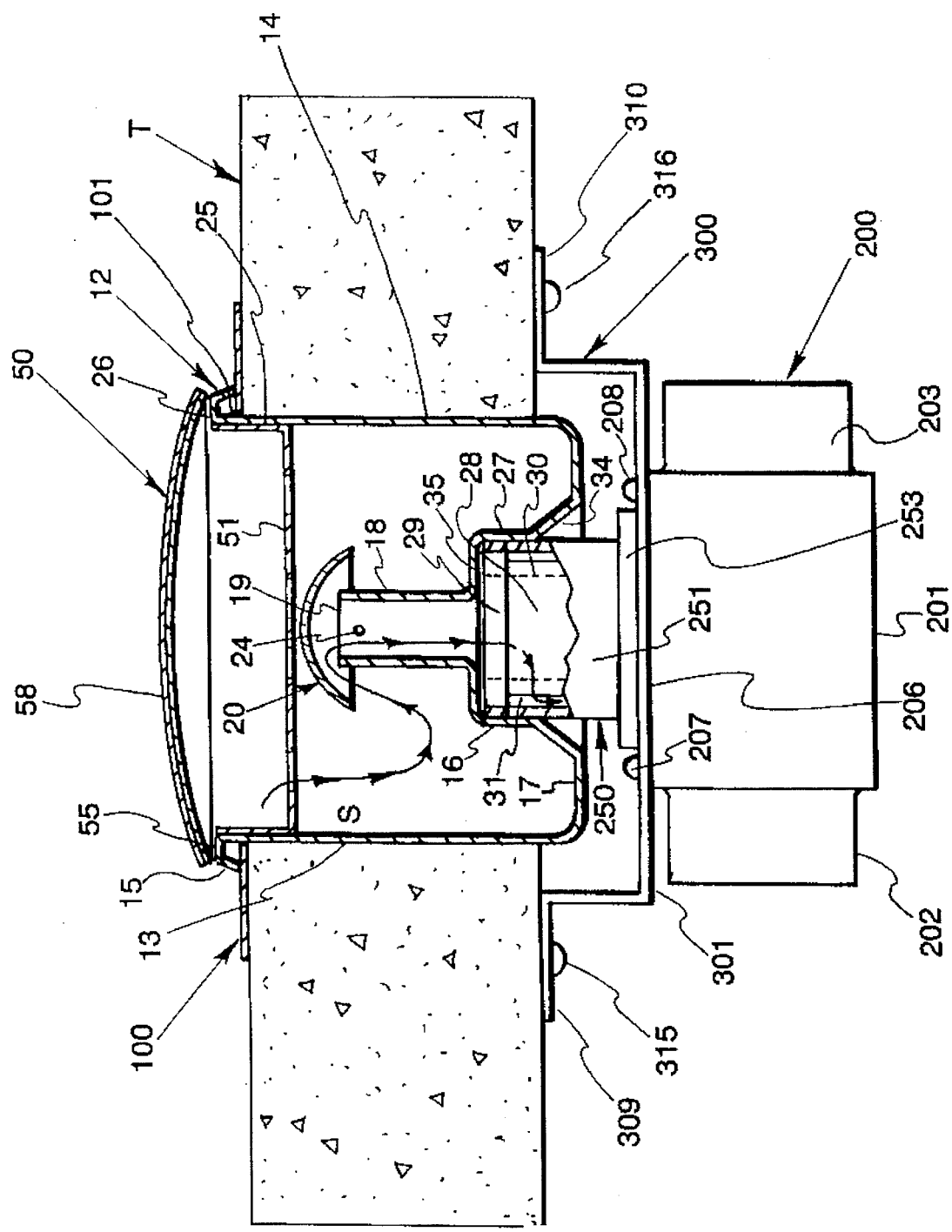
FIG. 5 is a central longitudinal cross-sectional view illustrating the ashtray component of the smokeless ashtray system of the present invention in an installed configuration.

With reference to FIG. 5, the details of the construction and manner of installation of the ashtray 12 in the table T will now be further described. The ashtray 12 preferably includes a stainless steel cylindrical cupshaped body 14 having a diameter of about 2.5 in. for insertion through a hole 13 cut through the table T by the hole saw HS (FIG. 1).

Most preferably, the body 14 of the ashtray 12 is dimensioned to replace a conventional ashtray of the type conventionally removeably inserted in existing holes provided in many casino gaming tables, thus avoiding the necessity of cutting holes in many instances. The conventional known form of ashtray commonly employed in such casino gaming tables is available from Langworth Casino Supply Company, Inc. and also from Bud Jones Company, both of Las Vegas, Nev. This conventional form of ashtray comprises a simple stainless steel cup with an insertable stainless steel screen member adapted for the support of cigarettes and cigars, but lacking any provisions for the vacuum removal and filtration of smoke.

With reference to FIGS. 5, 6, 16, 22, and 23, the ashtray 12 includes a centrally upstanding hollow cylindrical member 16 terminating in a central cylindrical tubular chimney 18 providing a pathway 19 for the passage of smoke S therethrough. As shown in FIG. 5, a cylindrical recess 27 formed coaxially with the member 16 and chimney 18 terminates in a planar annular sealing surface 35 surrounding the pathway 19. The cylindrical recess 27 opens outwardly, terminating in a frusto conical countersunk portion 34 intended to facilitate proper alignment of the ashtray 12 upon reinsertion after removal for cleaning purposes.

Figure 8:
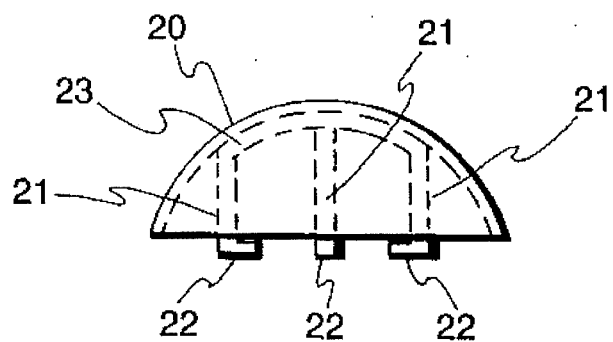
FIG. 8 is a side elevational view illustrating the debris shield portion of the ashtray component of the smokeless ashtray system of the present invention.
Figure 7:
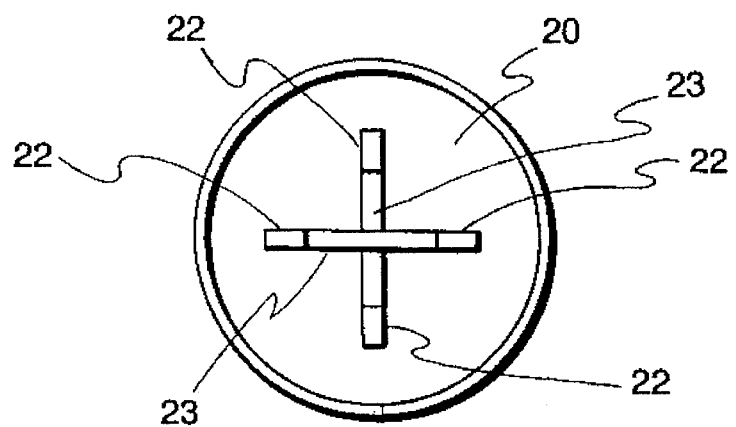
FIG. 7 is a bottom plan view illustrating the debris shield portion of the ashtray component of the smokeless ashtray system of the present invention.
Figure 6:
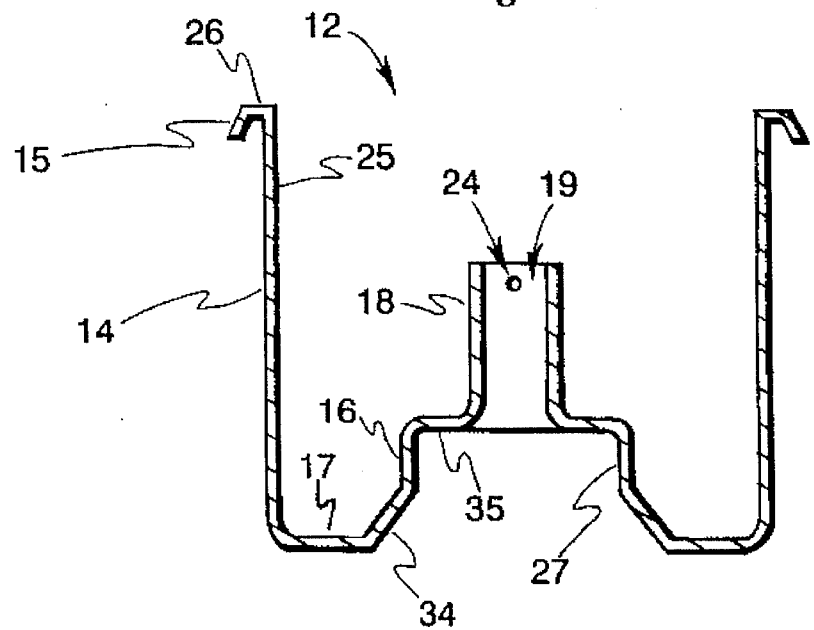
FIG. 6 is a central longitudinal cross-section view illustrating the cup portion of the ashtray component of the smokeless ashtray system of the present invention.
Figure 9:
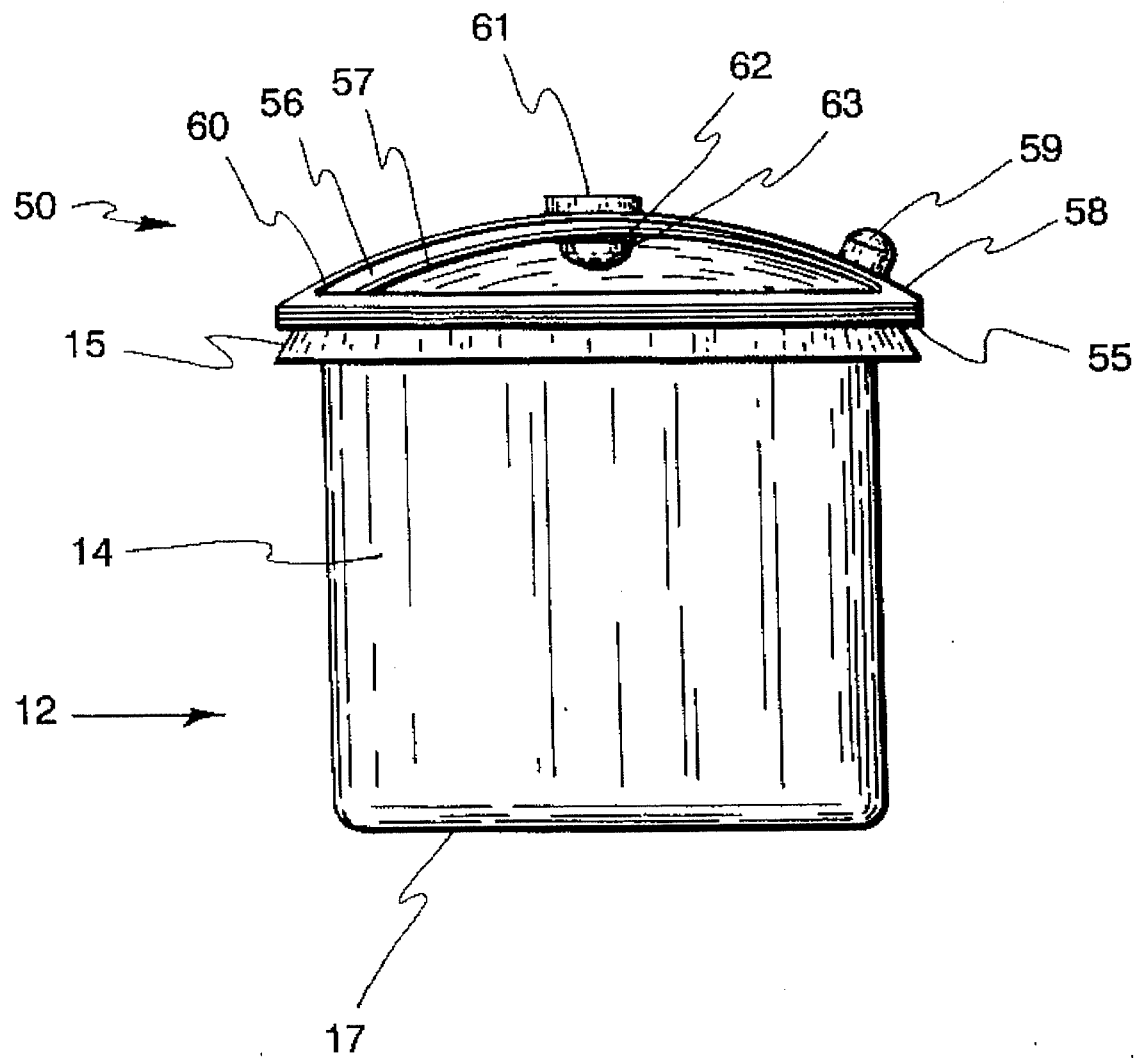
FIG. 9 is a front elevational view of the ashtray component of the smokeless ashtray system of the present invention.
Figure 10:
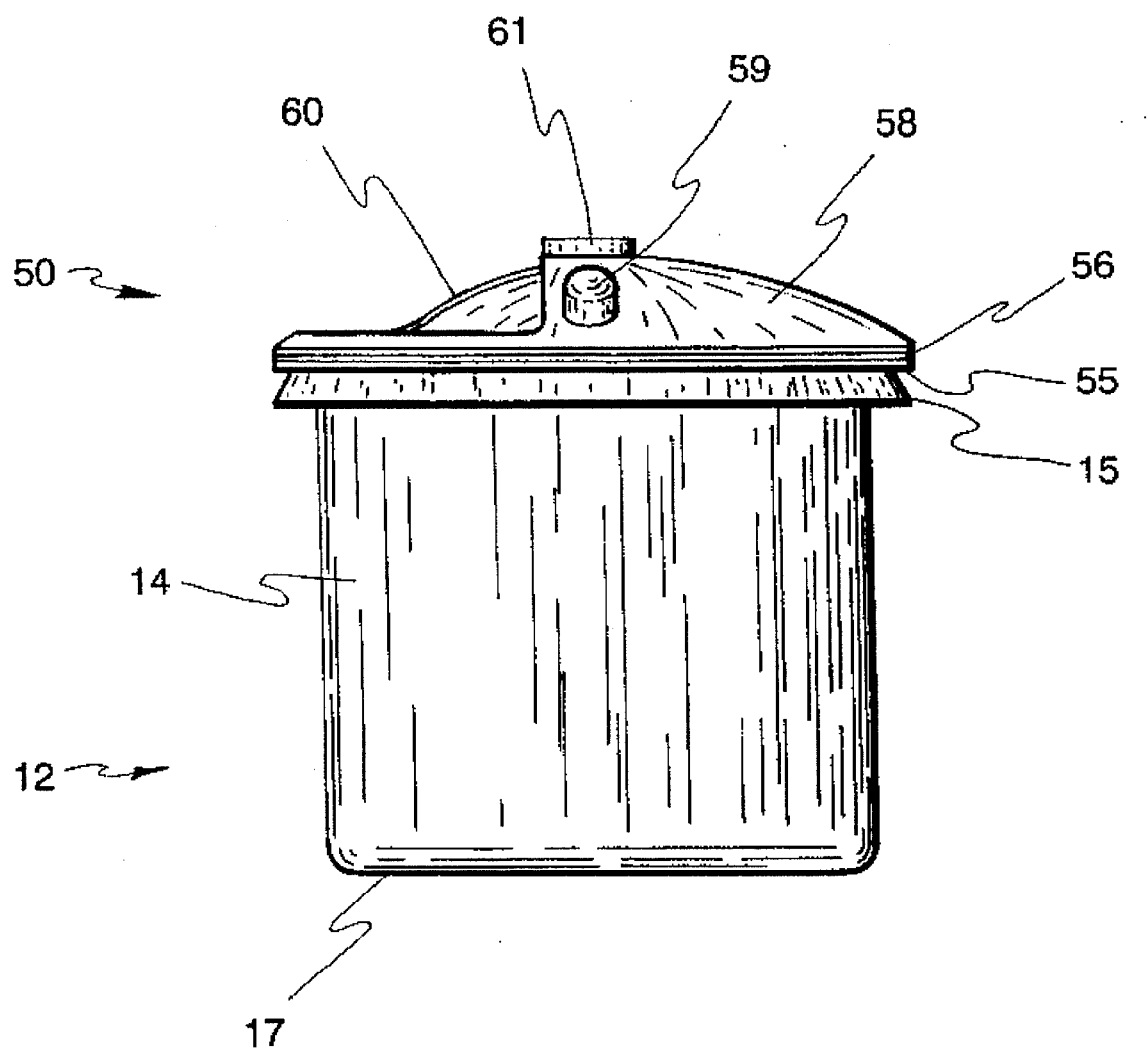
FIG. 10 is a left side elevational view of the ashtray component of the smokeless ashtray system of the present invention.
Figure 11:
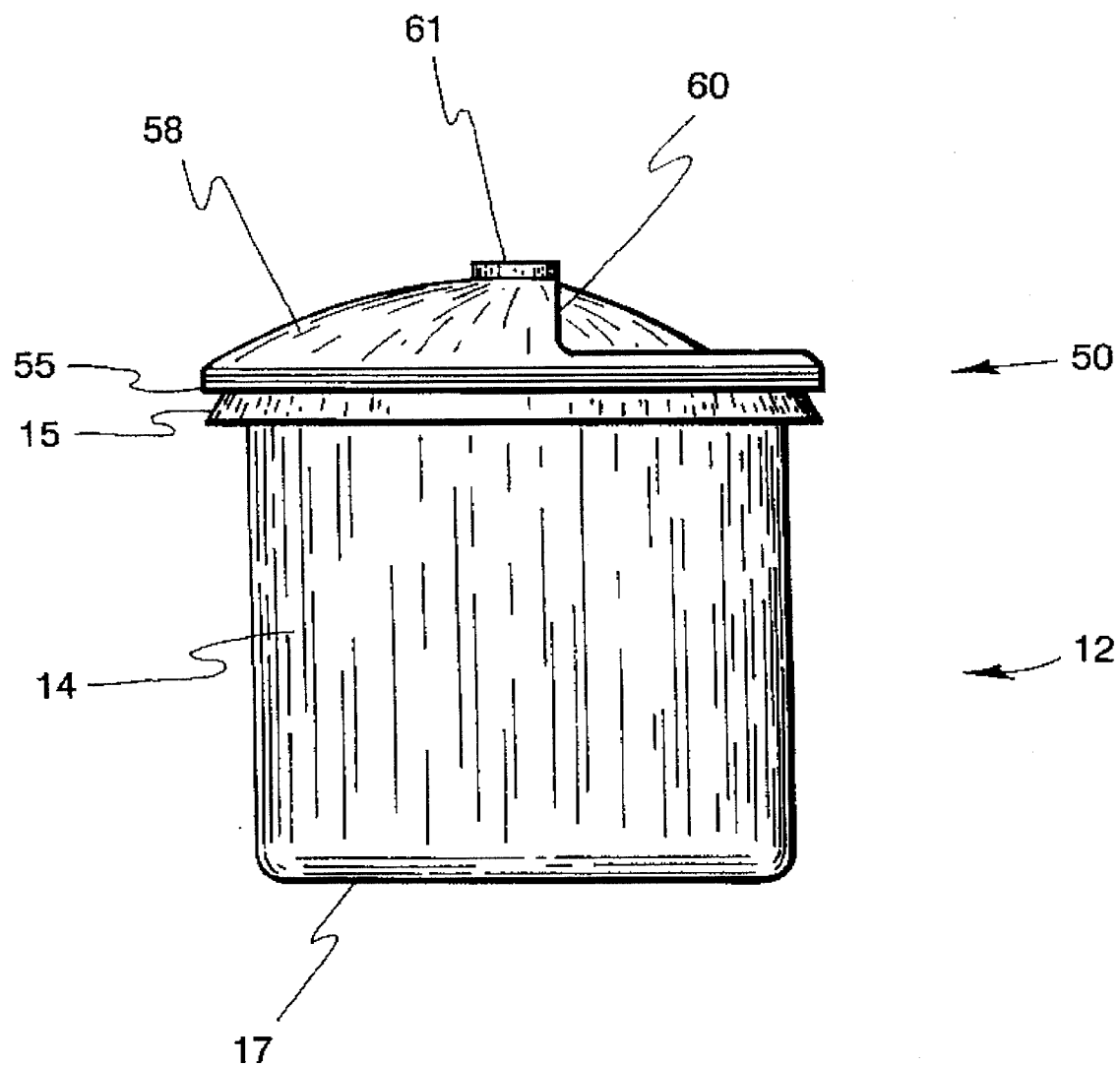
FIG. 11 is a right side elevational view of the ashtray component of the smokeless ashtray system of the present invention.
Figure 12:
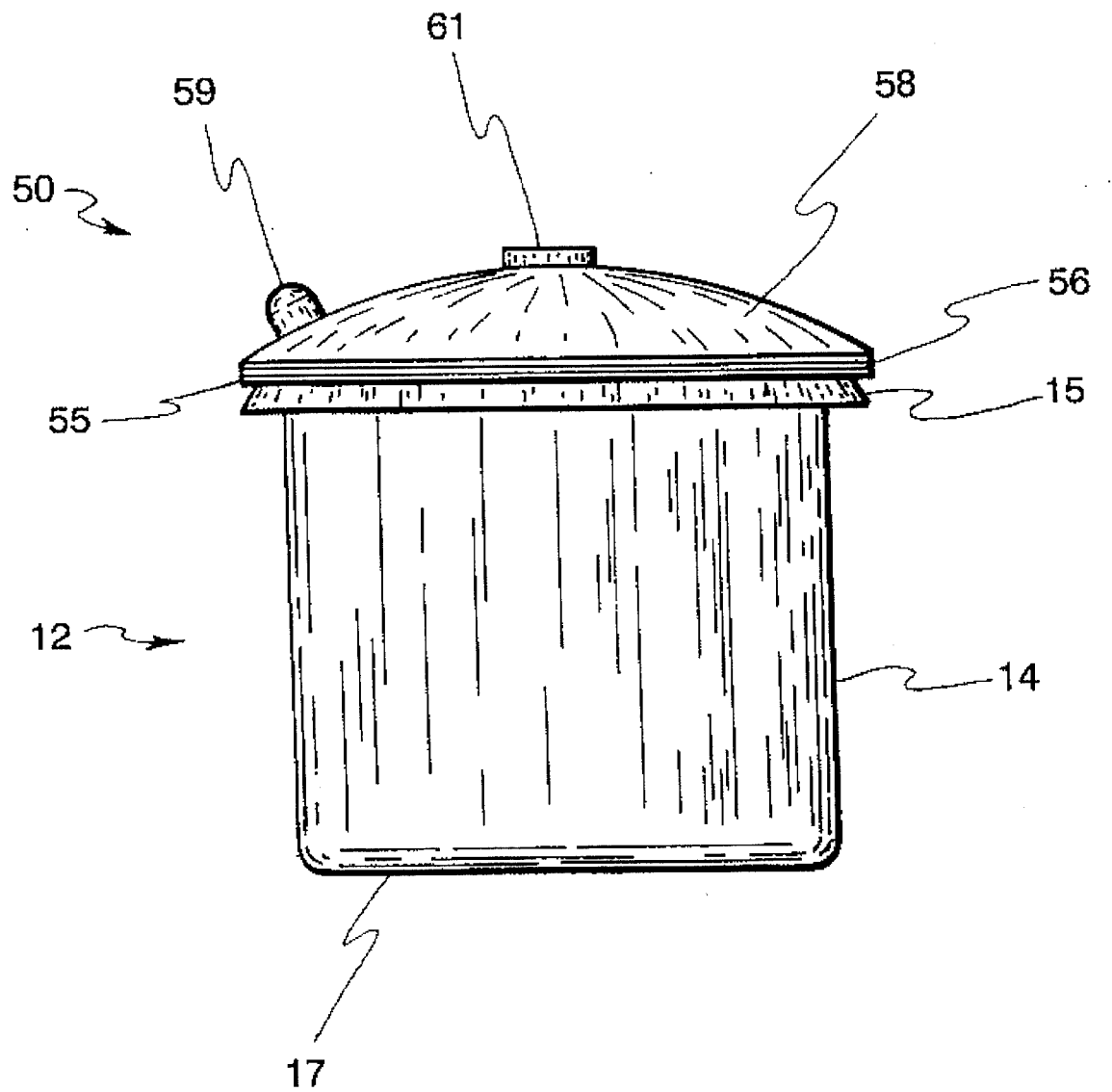
FIG. 12 is a rear elevational view of the ashtray component of the smokeless ashtray system of the present invention.
Figure 13:
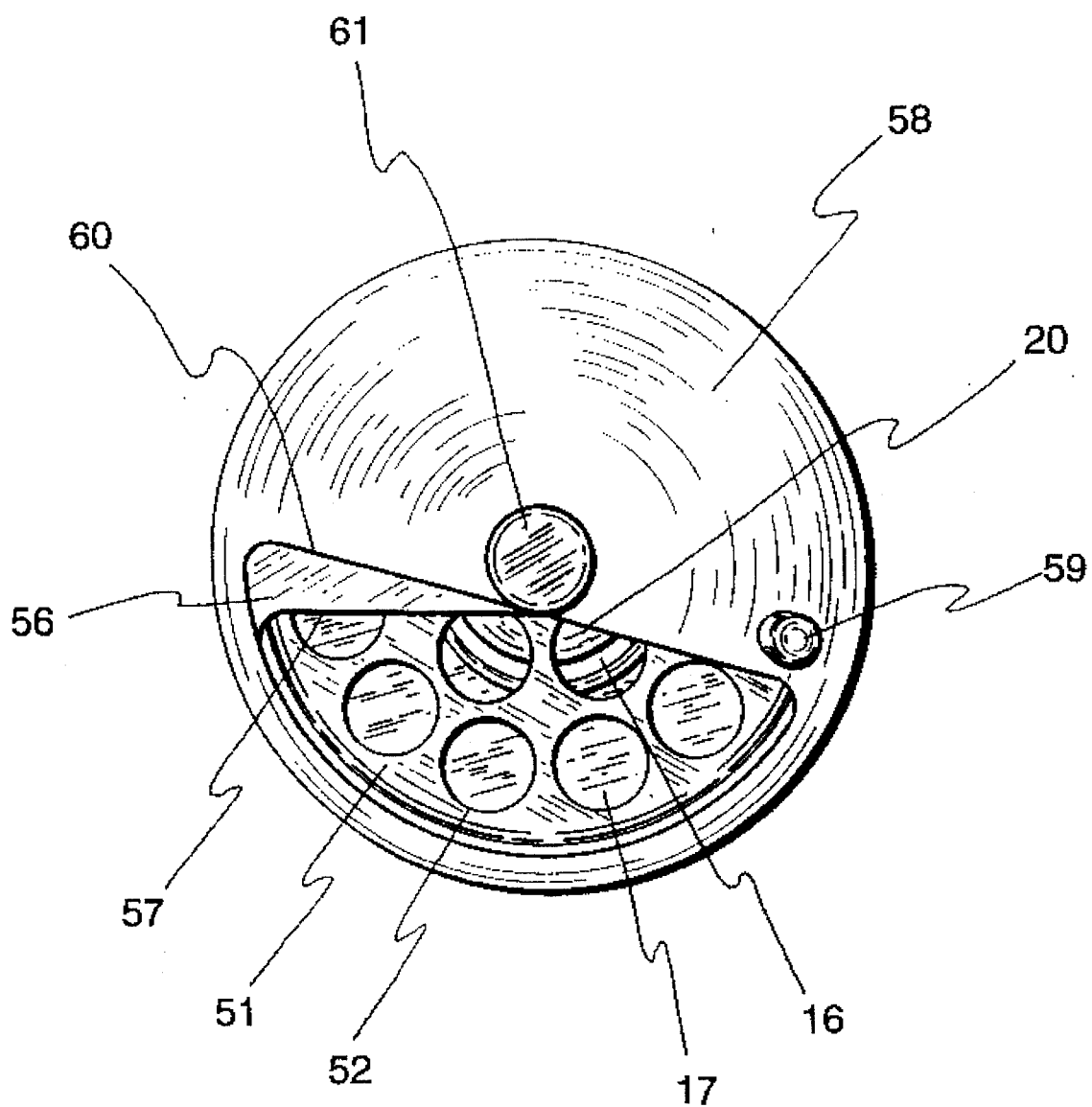
FIG. 13 is a top plan view of the ashtray component of the smokeless ashtray system of the present invention.
Figure 14:
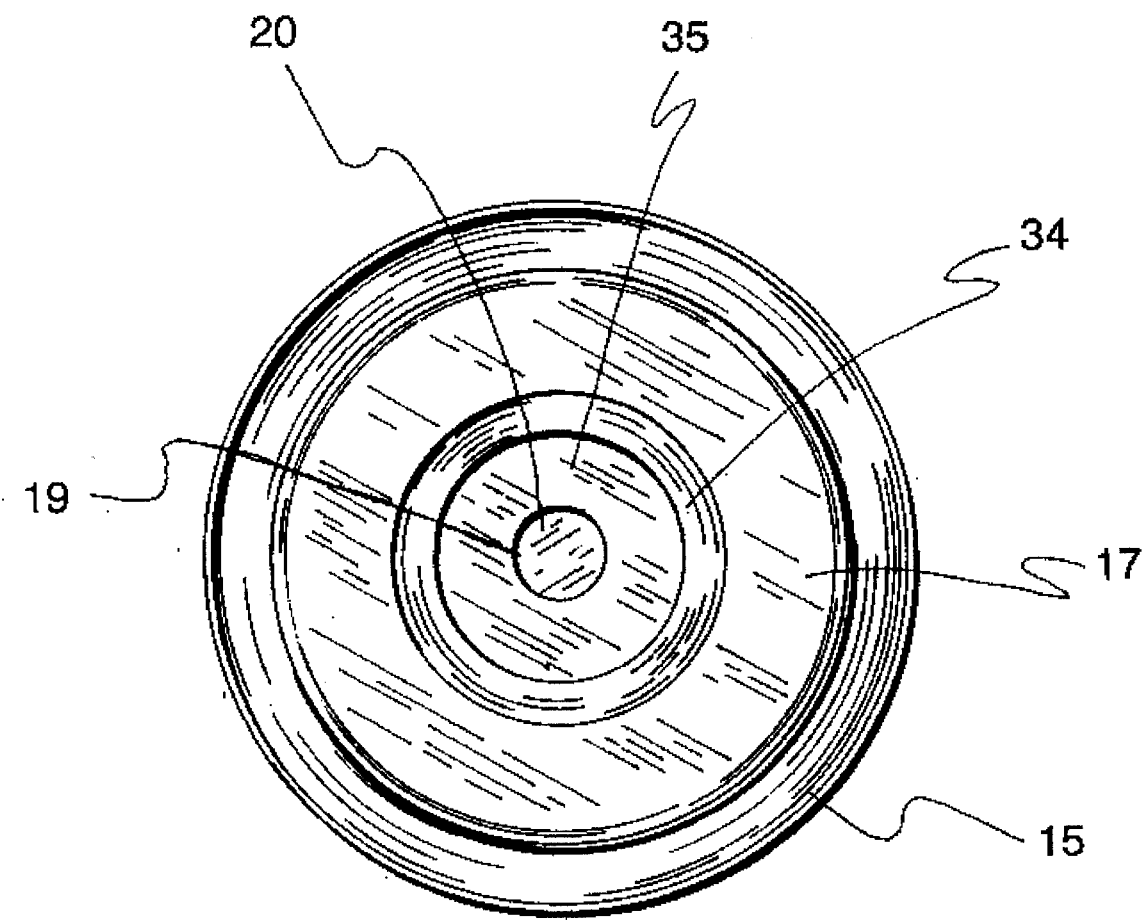
FIG. 14 is a bottom plan view of the ashtray component of the smokeless ashtray system of the present invention.
Figure 15:
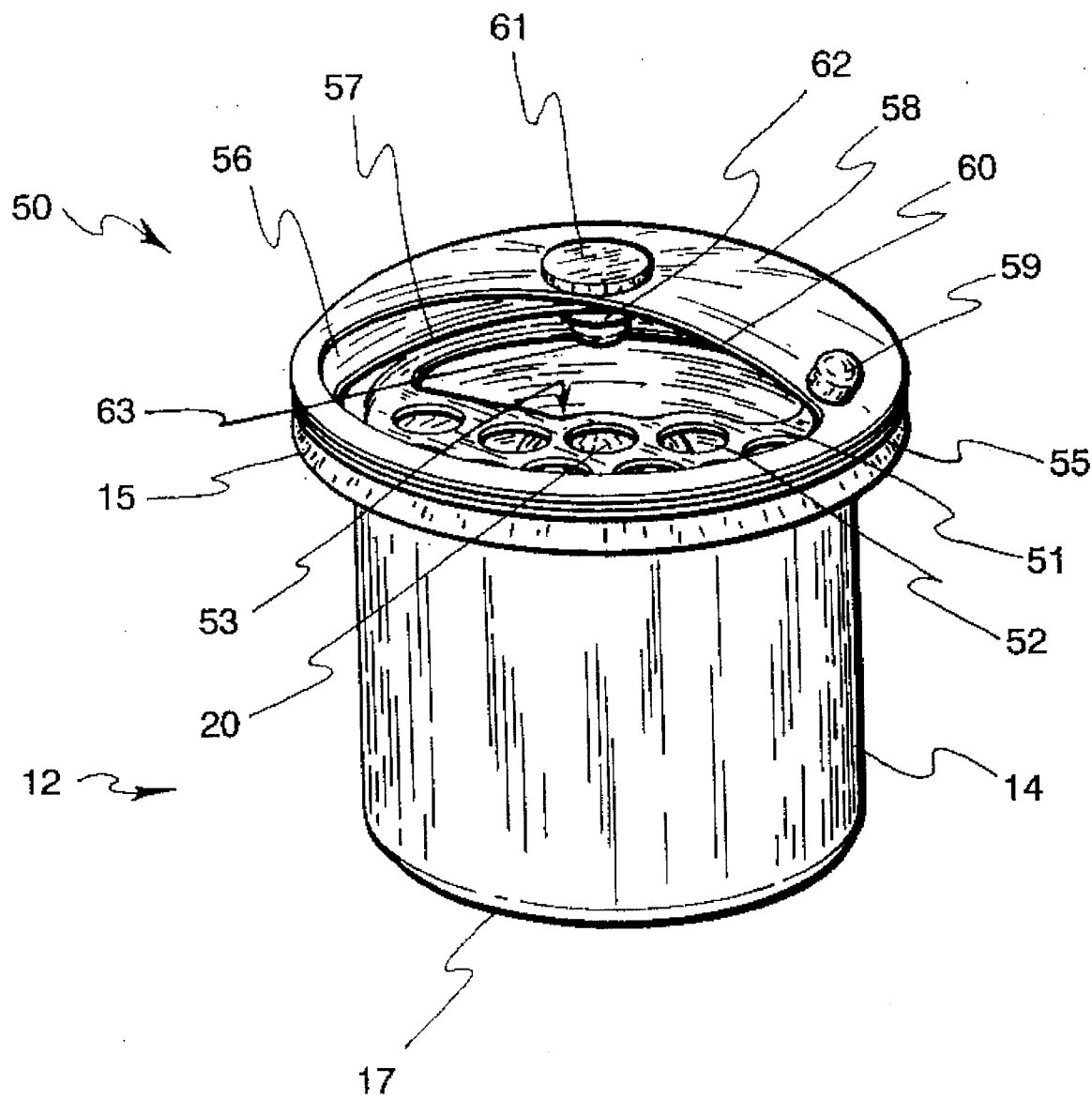
FIG. 15 is a front top perspective view of the ashtray component of the smokeless ashtray system of the present invention.
Figure 16:
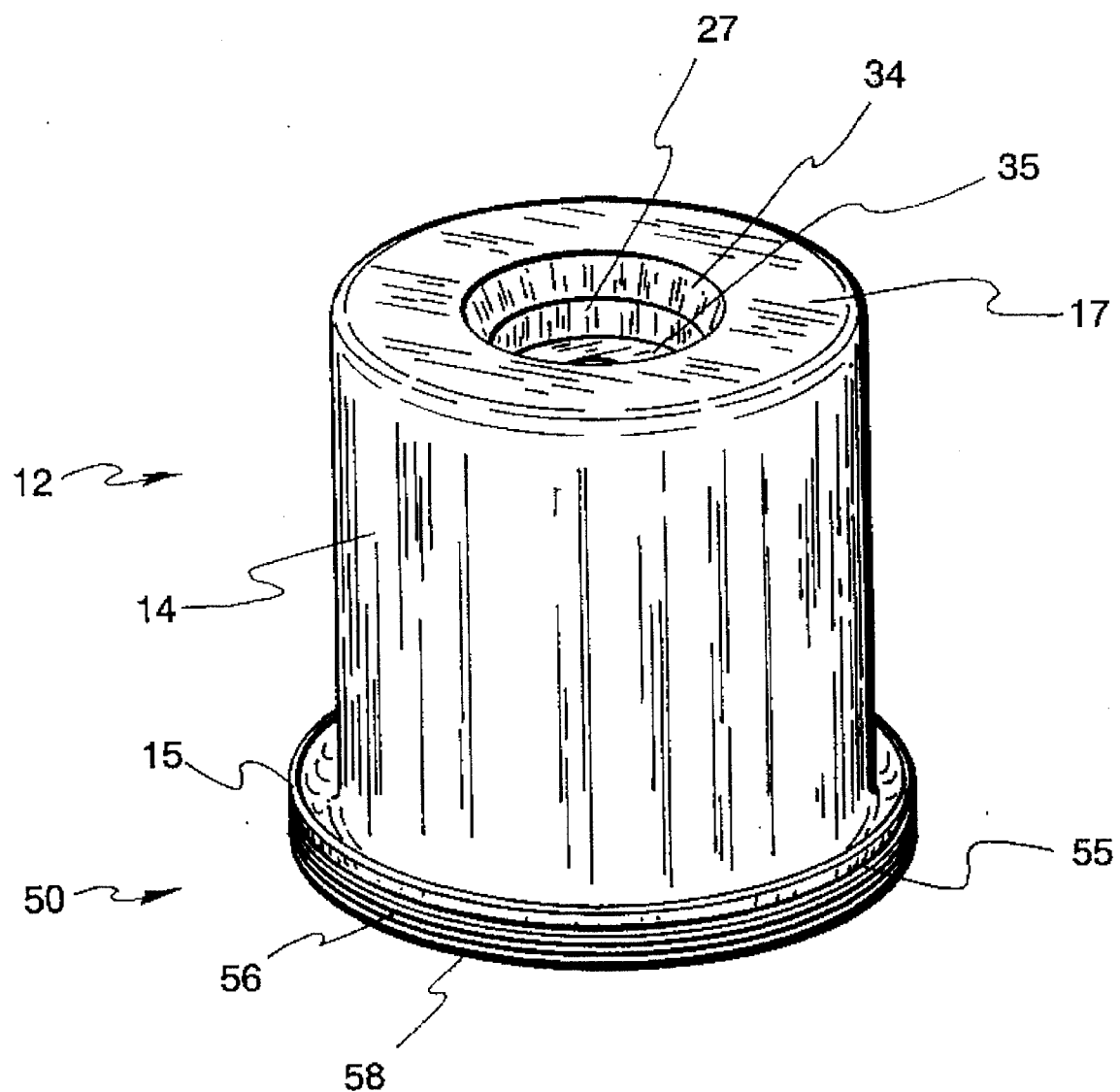
FIG. 16 is a bottom perspective view of the ashtray component of the smokeless ashtray system of the present invention.
Figure 17:
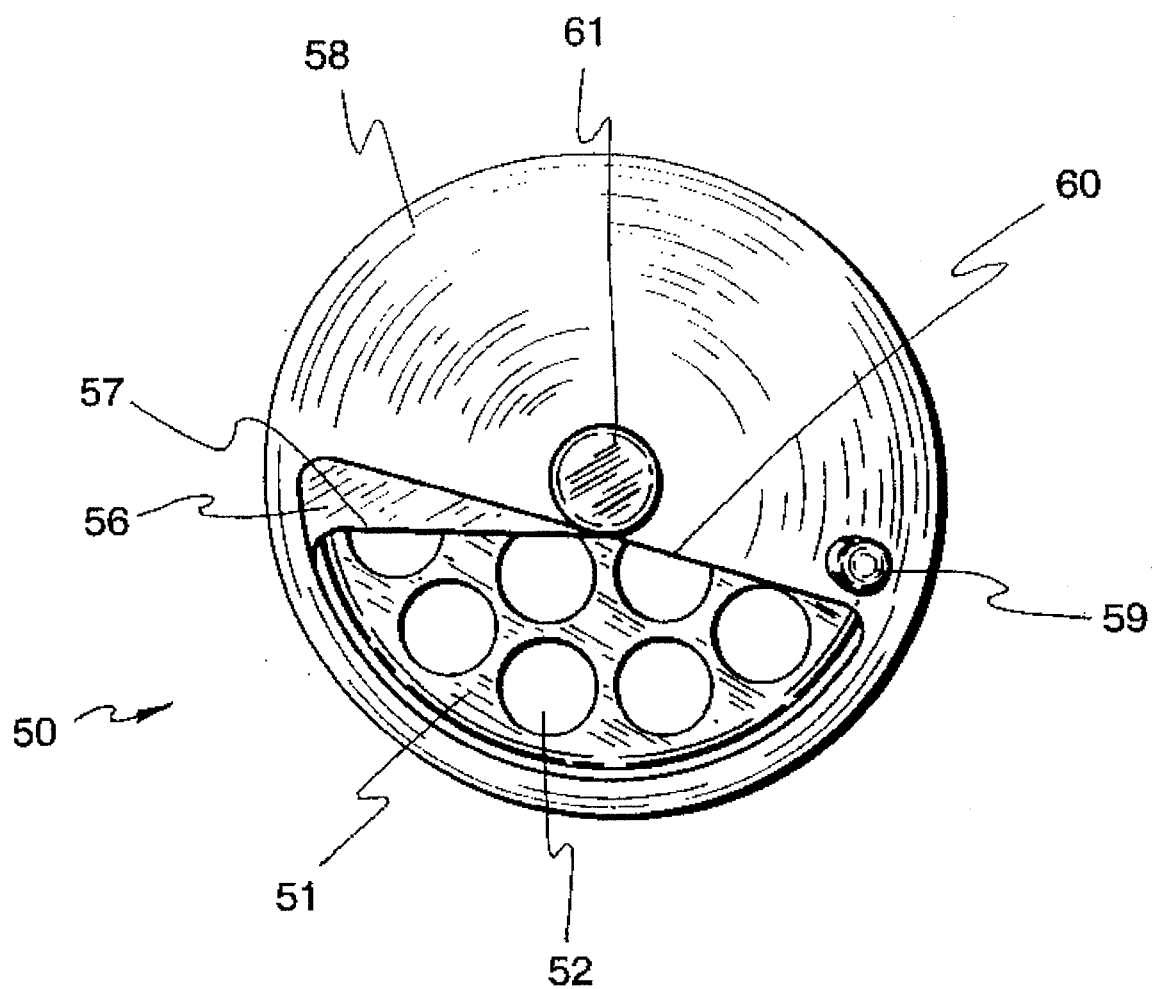
FIG. 17 is a top plan view of the cover portion of the ashtray component of the smokeless ashtray system of the present invention.
Figure 18:
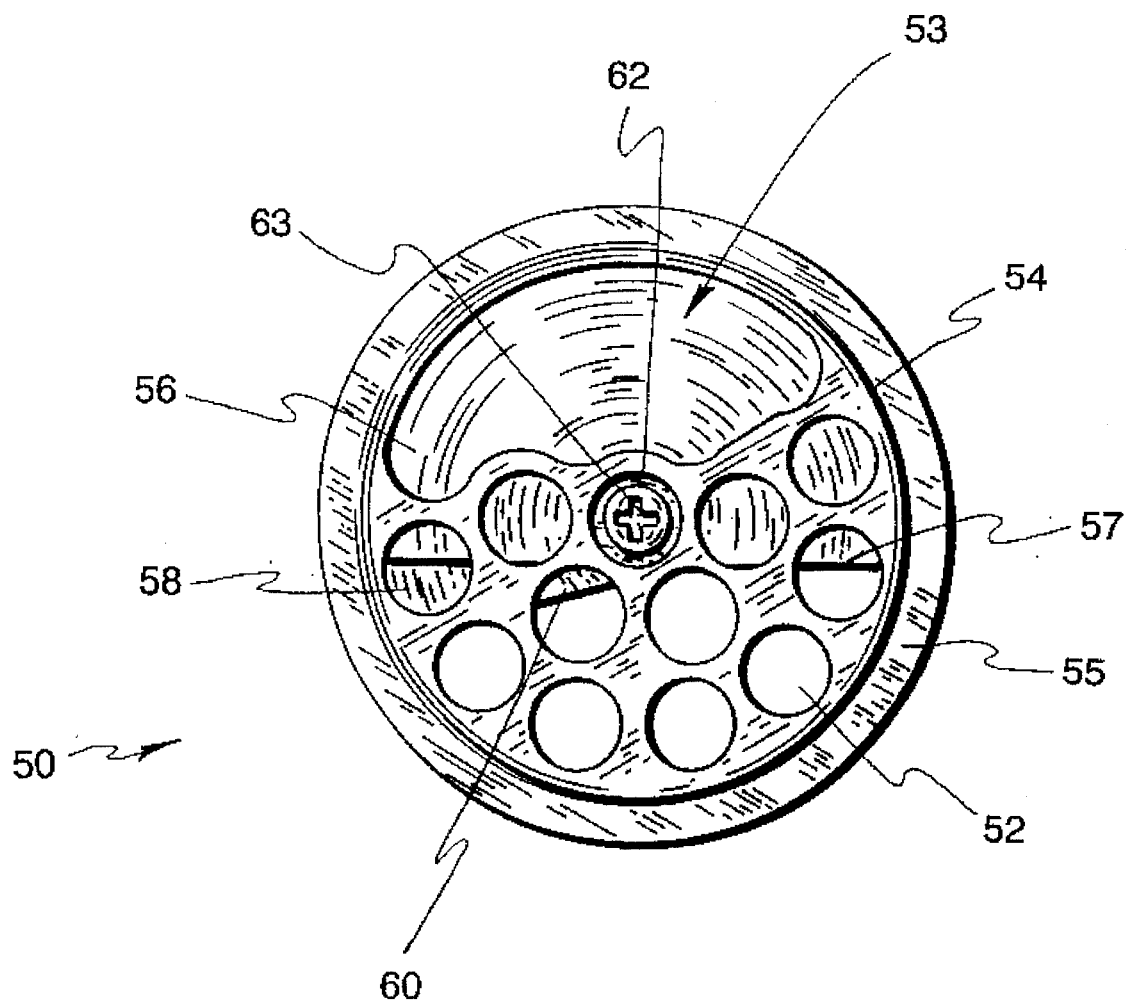
FIG. 18 is a bottom plan view of the cover portion of the ashtray component of the smokeless ashtray system of the present invention.
Figure 19:
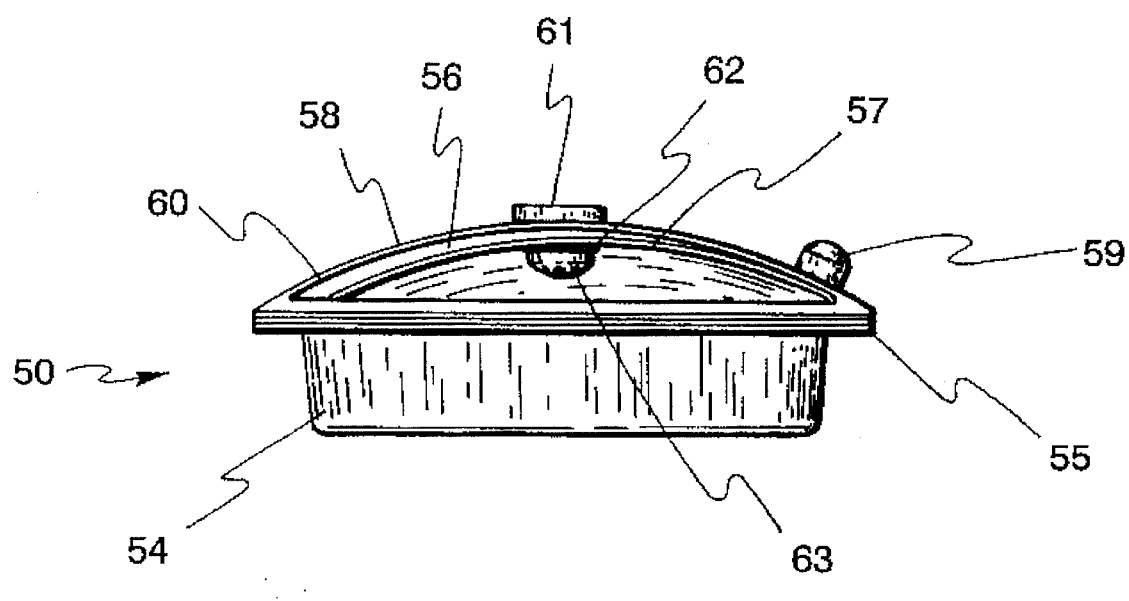
FIG. 19 is a front elevational view of the cover portion of the ashtray component of the smokeless ashtray system of the present invention.
Figure 20:
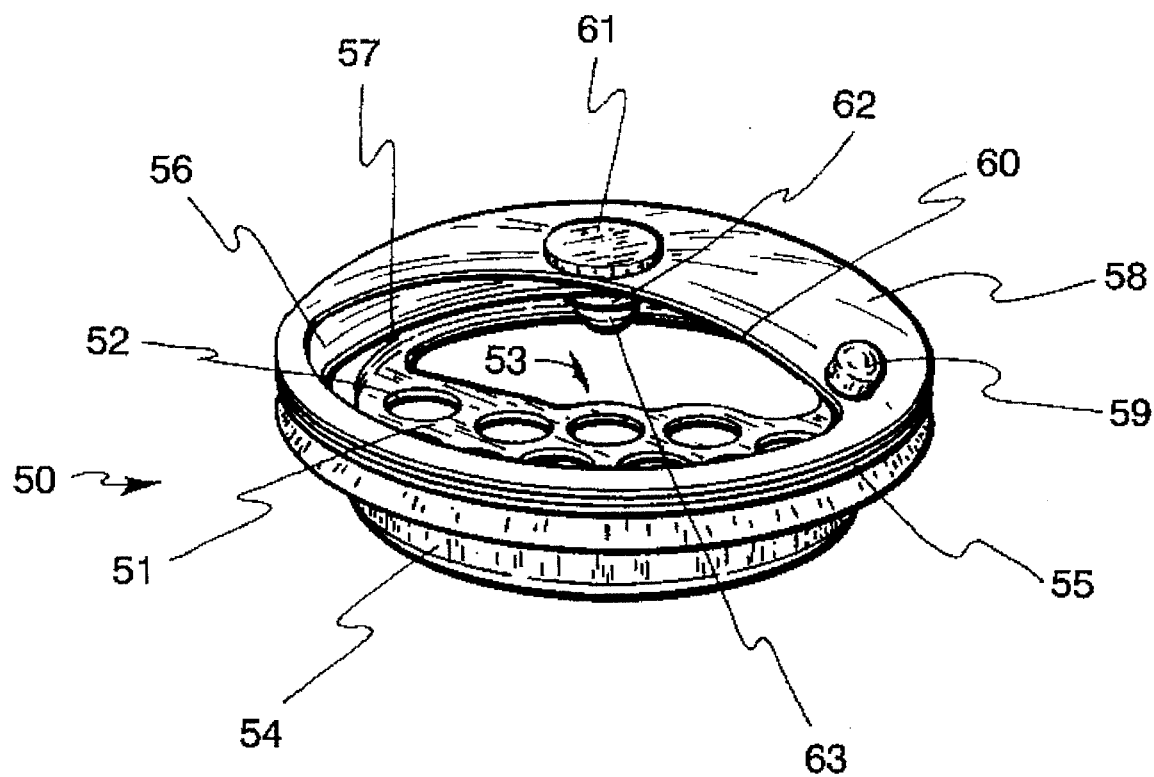
FIG. 20 is a front top perspective view of the cover portion of the ashtray component of the smokeless ashtray system of the present invention.
Figure 21:
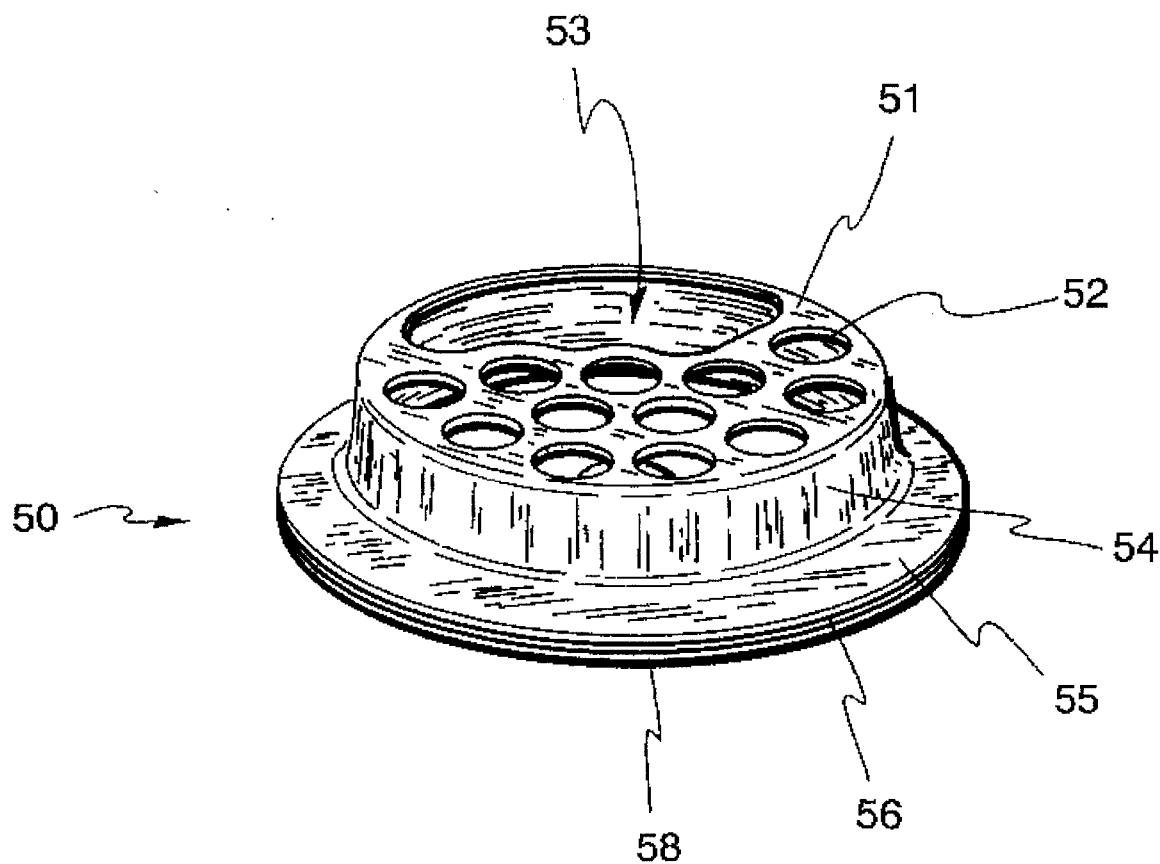
FIG. 21 is a bottom perspective view of the cover portion of the ashtray component of the smokeless ashtray system of the present invention.
Figure 22:
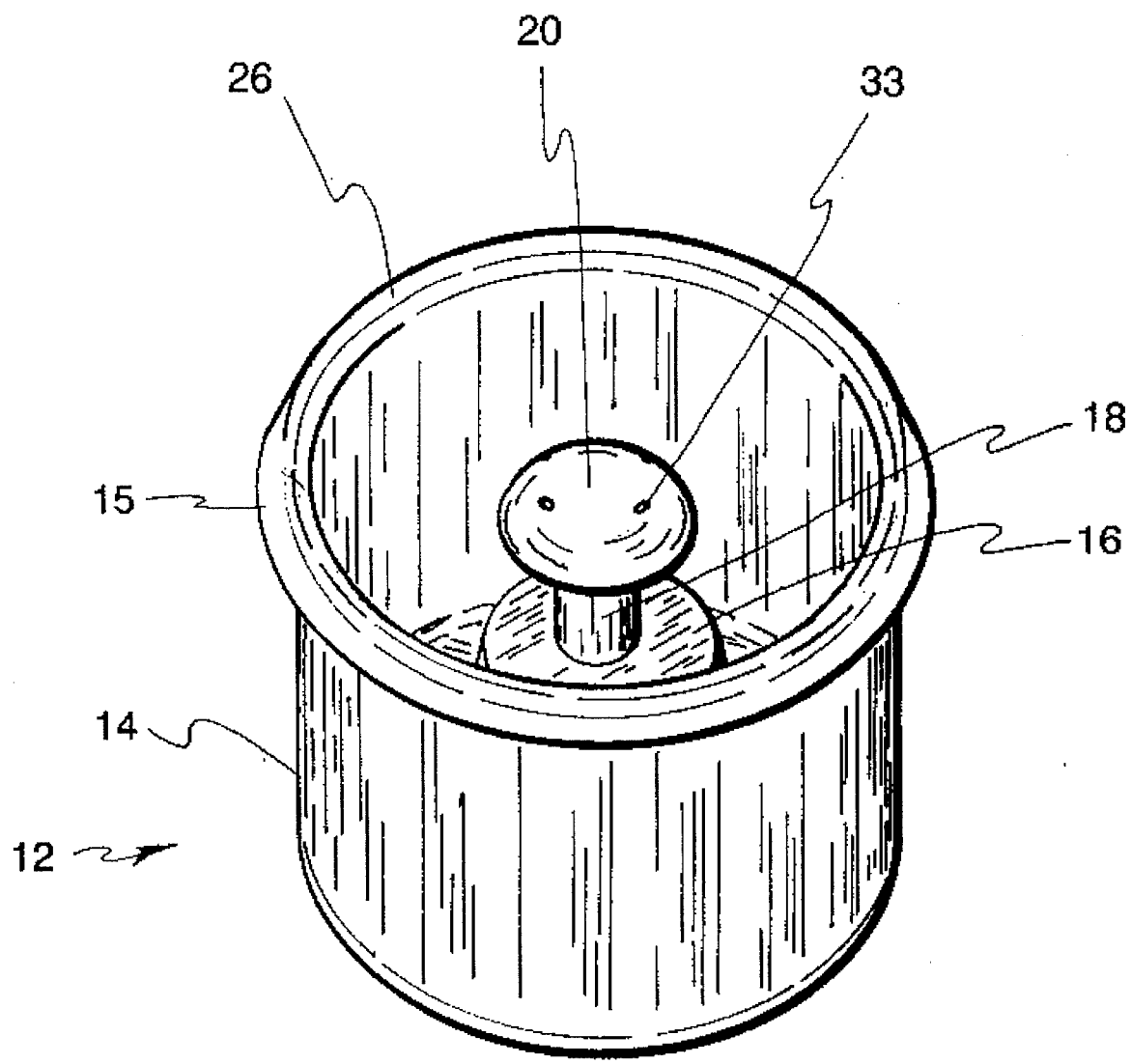
FIG. 22 is a top perspective view of the ashtray component of the smokeless ashtray system of the present invention with the cover removed.
Figure 23:
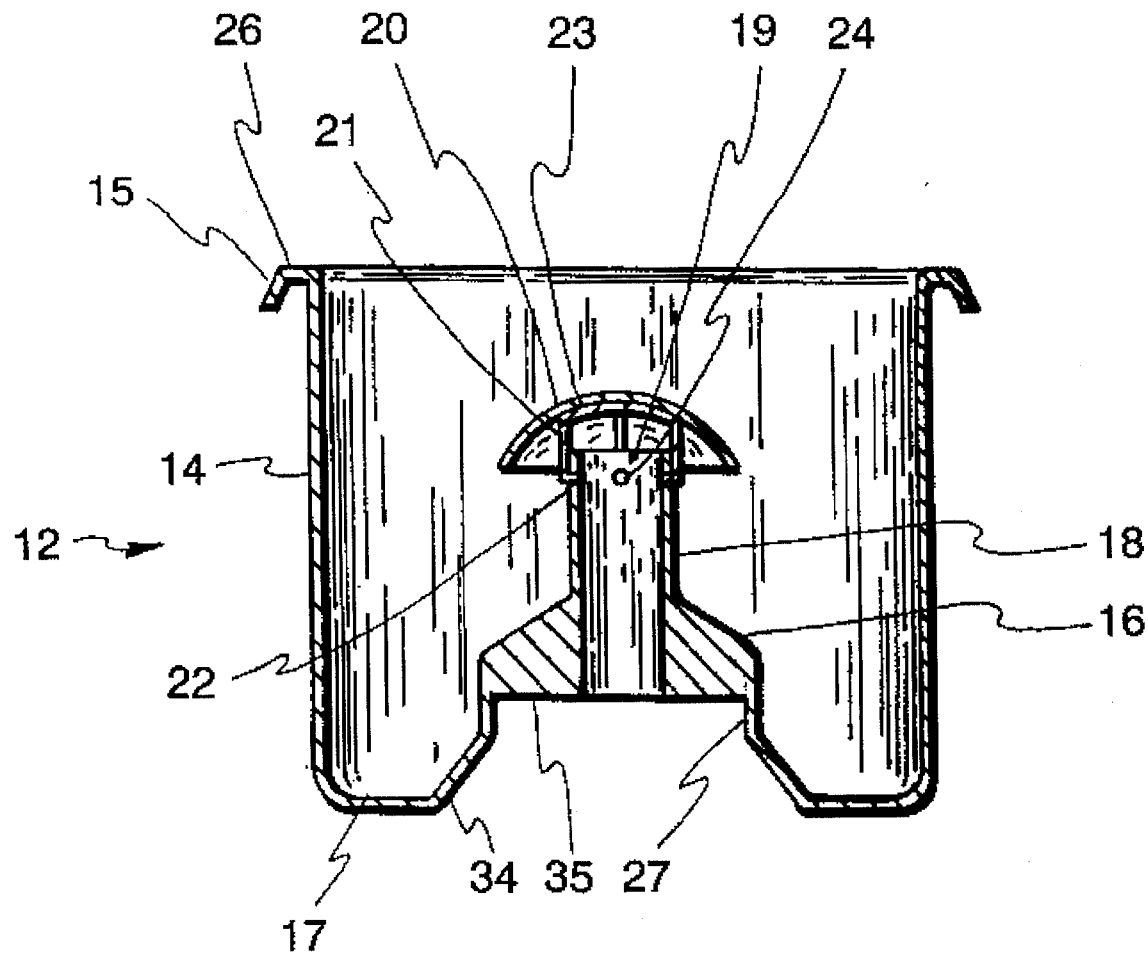
FIG. 23 is a central longitudinal cross sectional view of the ashtray component of the smokeless ashtray system of the present invention with the cover removed.

In order to prevent ashes, butts, and other debris from passing through the chimney 18 and potentially clogging the system, a generally hemispherical shield dome 20 overlies the open upper end of the chimney 18, as depicted in FIGS. 5, 22, and 23. As shown in FIGS. 7, 8, and 23, four L-shaped clips 21, 22 depend downwardly from bases 23 secured to the interior of the shield 20. The four short legs 22 of the clips extend through four small holes 19 spaced evenly around the circumference of the chimney 18, for the purpose of securing the shield in position. Preferably, the shield 20 is formed from stainless steel, and the clips comprise stainless steel wire members spot welded to the shield 20. As shown in FIG. 22, four small air vent apertures 33 extend through the shield 20 for the purpose of creating an air stream through the chimney 18 sufficient to create a low pressure area in the region between the underside of the shield 20 and the top opening of the chimney 18. This results in the effective entrainment of smoke in the air stream, as shown at flow path S in FIG. 5. While Stainless steel is preferred, the ashtray 12 and related components 18 and 20 may alternatively be integrally molded from a phenolic plastic material.

As can be appreciated from FIGS. 5 and 37, a cylindrical coalescing filter element 28 is received coaxially within an upper cylindrical tubular portion 251 of the associated flue member 250. This type of filter element media is available from the Finite Filter Division of Hanafin Parker, under the designation FINITE GRADE 8, and comprises a multipleply roll of a borasilicate microglass filter medium with graded porosity to remove aerosols and larger contaminants from an airstream. The filter element includes an upper end cap 29 in the form of a cylindrical annular element formed from a resilient elastomeric material. The upper end cap 29 is secured to the filter element 28, and has a diameter slightly larger than the filter element 28. When the end cap 29 is pressed within the tubular portion 251 of the flue member 250, an air-tight seal is formed which forces the smoke S to pass through a central cylindrical passageway 30 in the filter element 28, and out through the pores of the filter material along the annular space between the outer sidewall of the filter element 28 and the inner sidewall of the tubular portion 251. The filter element 28 also includes a closed bottom end cap 32 which prevents the smoke from passing clear through the hollow interior of the filter 28, and thus avoiding filtration. As shown in FIG. 5, the upper end face of the elastomeric upper end cap 29 is preferably adapted to press against the annular sealing surface 35 of the ashtray 12, thus sealing smoke S against escape to ambient between the tubular portion 251 and the wall of recess 27. Frictional engagement of the upper end cap 29 within the tubular portion 251 retains the filter element 28 in position.

FIG. 38 illustrates an alternative construction for the end cap 29' in which the end cap 29' overlaps the upper end face of the tubular portion 251, instead of being frictionally engaged therein. In this construction, the end cap 29' might be formed from plastic or metal, or from a resilient elastomeric material.

The filter 28 serves to remove tars and other visible components of smoke from the airstream prior to passage into the manifold. The filters 28 may be easily replaced by first lifting the ashtry 12 out of the hole 13 to expose the filter 28, as shown in FIG. 5.

As shown in FIGS. 5, 9–13, and 15–21, a cover assembly 50 for the ashtray 12 includes a cylindrical plug portion 54 dimensioned for insertion within the open upper end portion 25 of the body 14 of the ashtray 12. A plurality of spaced circular holes 52 in a floor 51 of the plug portion 54 form a screen adapted for the passage of smoking residue such as ashes and butts. An irregular, but generally arcuate window 53 in the screen 51 provides a passage through which any butts accumulating on the screen 51 will fall. Because of the enhanced air flow created by the vacuum system, an accumulation of butts on the screen 51 might otherwise present a fire hazard. Even a relatively small fire on the screen 51 might significantly heat the cover assembly 50, creating a burn hazard for users. An upper end of the plug portion 54 terminates in a radially outwardly extending circular flange 55 dimensioned to overlie the annular top rim 26 of the ashtray 12. A convex dome-shaped cover plate 56 includes peripheral edge portions secured by spot welding to the upper surface of the flange 55. Orientation of an arcuate window 57 in the cover plate 56 above the screen 51 provides user access for the deposit of ashes, butts, and the temporary resting of cigars and cigarrettes. A convex dome-shaped slide plate 58 overlies the cover plate 56 and includes an arcuate window 60 selectively rotatable about the axis of a pivot bearing 61 into registry with the window 57 in an "OPEN" position. Alternatively, manual rotation of the slide plate 58 by manipulation of a handle knob 59 to move the window 60 out of registry with the window 57 effects closure of the cover assembly 50 to a "CLOSED" position when not in use. The pivot bearing 61 takes the form of an internally threaded sleeve extending centrally through aligned apertures in the slide plate 58 and the cover plate 56 and terminating at an upper end in a radially enlarged head 62. A washer 62 and a screw 63 serve to secure the slide plate 58 to the cover plate 56, but not so tightly as to preclude rotation of the slide plate 58.

As can be appreciated from FIG. 5, the cover assembly 50 may be merely lifted out of the ashtray 12 for cleaning purposes. Likewise, the ashtray 12 may also be lifted upwardly out of the hole 13 in the table T, without the need to disconnect any fitting or use any tools, in order to dump accumulated ashes and butts. Advantageously, the cover 50 and ashtray 12, both preferably formed from stainless steel or alternatively from phenolic plastic, may be conveniently cleaned in a commercial dishwasher without fear of damage. Upon replacement, the flange 15 of the ashtray 12 abuts the upper surface of the trim ring 100, which serves to provide an attractive appearance as well as acting as a burn shield for the table T in the event a cigar or cigarette inadvertently falls adjacent the ashtray 12.

Figure 24:
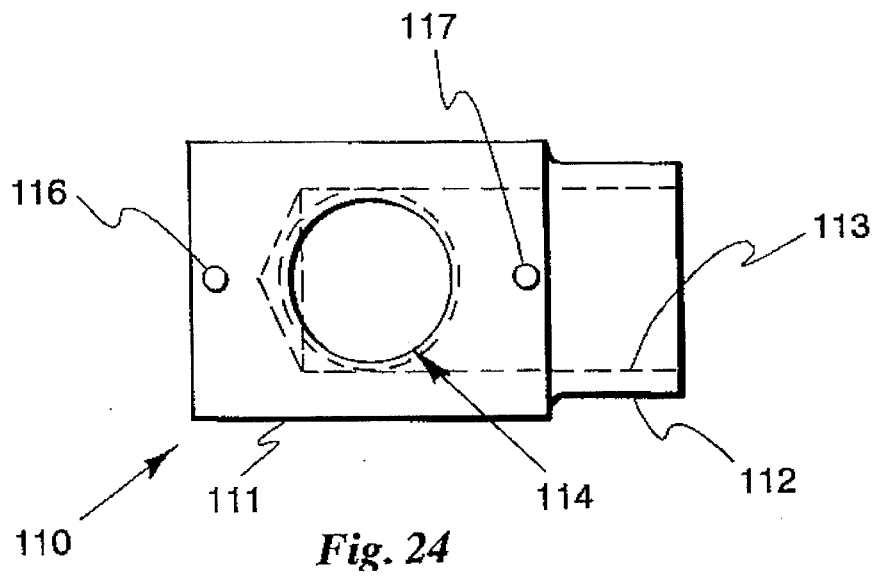
FIG. 24 is a top plan view of an L connector used in the vacuum manifold conduit assembly of the smokeless ashtray system of the present invention.
Figure 25:
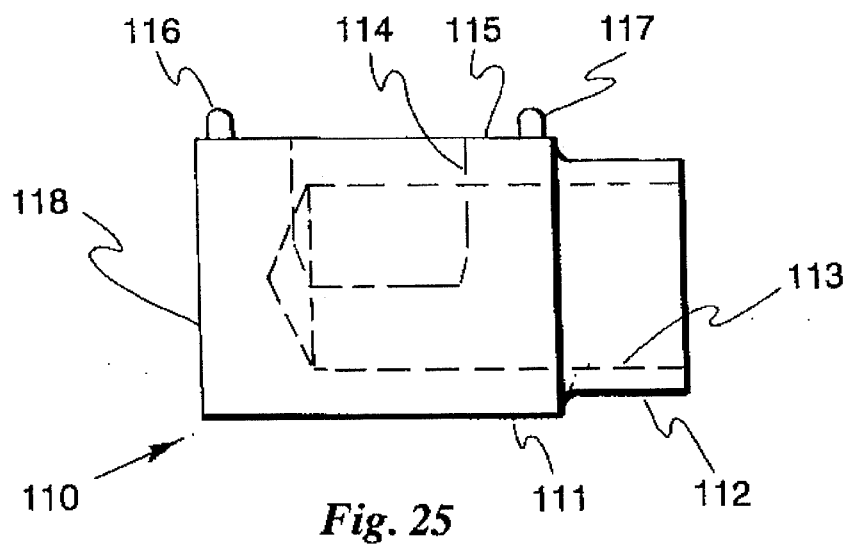
FIG. 25 is a side elevational view of the L connector used in the vacuum manifold conduit assembly of the smokeless ashtray system of the present invention.
Figure 26:
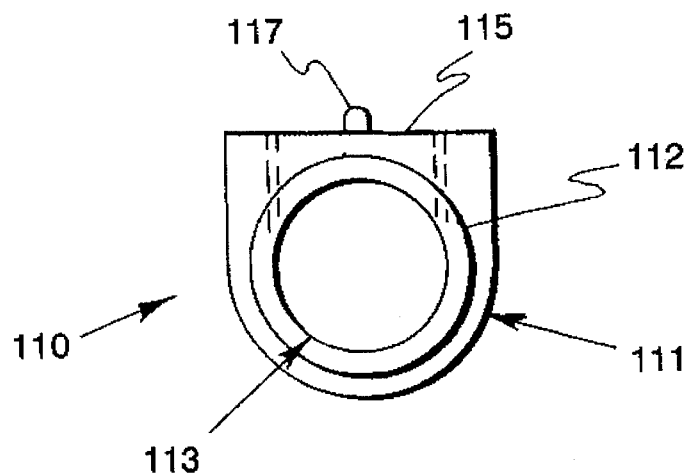
FIG. 26 is an end elevational view of the L connector used in the vacuum manifold conduit assembly of the smokeless ashtray system of the present invention.

As shown in FIGS. 24–26, the L vacuum conduit connectors 110 each include a body 111 having a lower semi-cylindrical portion and an upper rectangular portion having a flat top surface 115. A cylindrical coupling leg 112 includes a cylindrical passage 113 which perpendicularly intersects a threaded aperture 114 extending downwardly through the flat top surface 115. A pair of alignment protuberances or pins 116 and 117 project upwardly from the flat surface 115 on opposite sides of the bore 114 for a purpose described hereinafter. The pins 116 and 117 terminate in hemispherical top surfaces. A closed end face 118 of the connector 110 disposed opposite the coupling leg 112 forms one end of the vacuum manifold system, inasmuch as the L connectors 110 are utilized on only the end most ashtray locations of the system.

Figure 27:
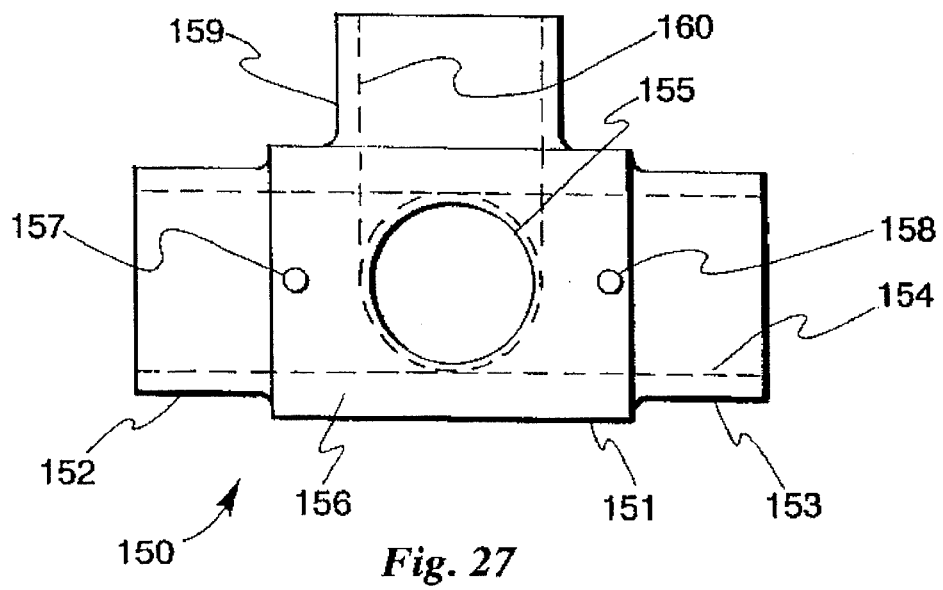
FIG. 27 is a top plan view of a four-way connector used in the vacuum manifold conduit assembly of the smokeless ashtray system of the present invention.
Figure 28:
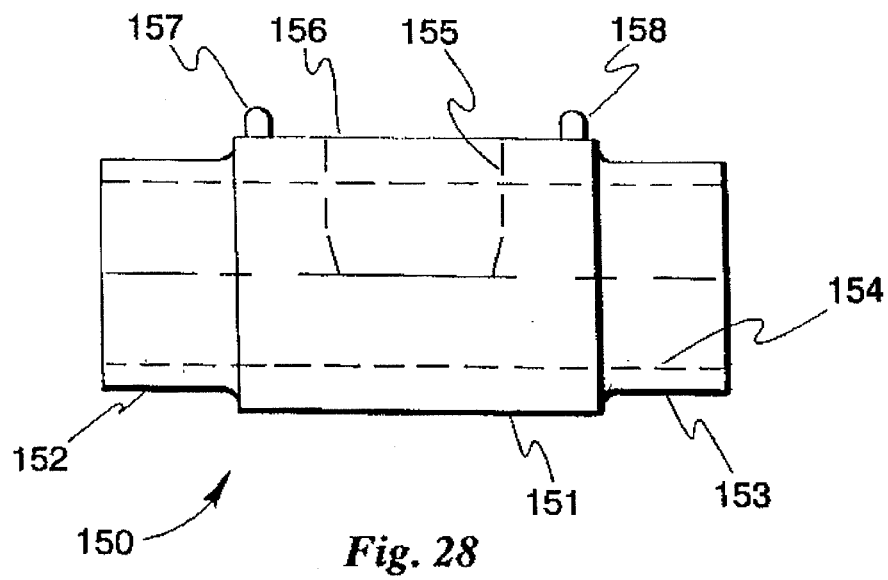
FIG. 28 is a side elevational view of the four-way connector used in the vacuum manifold conduit assembly of the smokeless ashtray system of the present invention.
Figure 29:
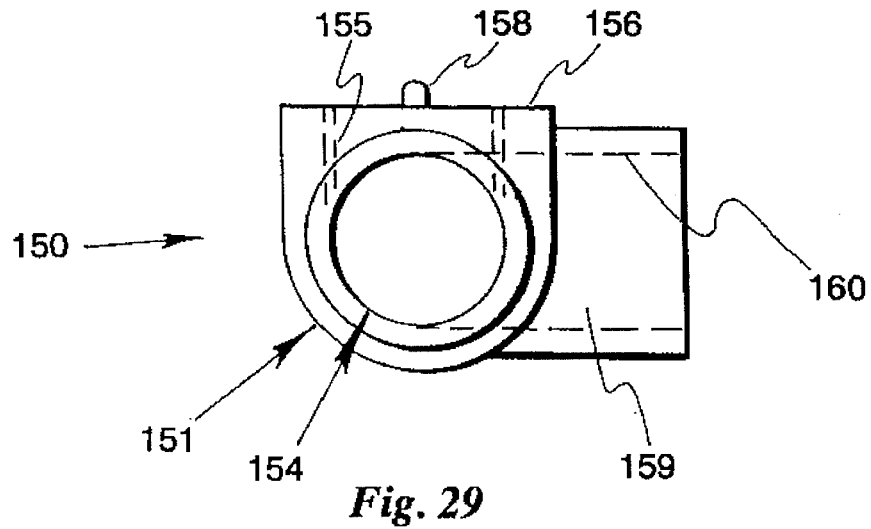
FIG. 29 is an end elevational view of the four-way connector used in the vacuum manifold conduit assembly of the smokeless ashtray system of the present invention.

FIGS. 27–29 illustrate the construction details of the single central four-way connector 150 which includes a body 151 having a lower semi-cylindrical portion and an upper rectangular portion having a flat top surface 156. Oppositely directed aligned cylindrical coupling legs 152 and 153 include a cylindrical passage 154 which perpendicularly intersects a threaded aperture 155 extending downwardly through the flat top surface 156. A pair of alignment protuberances or pins 157 and 158 project upwardly from the flat surface 156 on opposite sides of the bore 155 for a purpose described hereinafter. The pins 157 and 158 terminate in hemispherical top surfaces. An additional cylindrical coupling leg 159 includes a cylindrical passage 160 which perpendicularly intersects the bore 155 and the passage 154, thus forming a four-way fluid connection.

Figure 30:
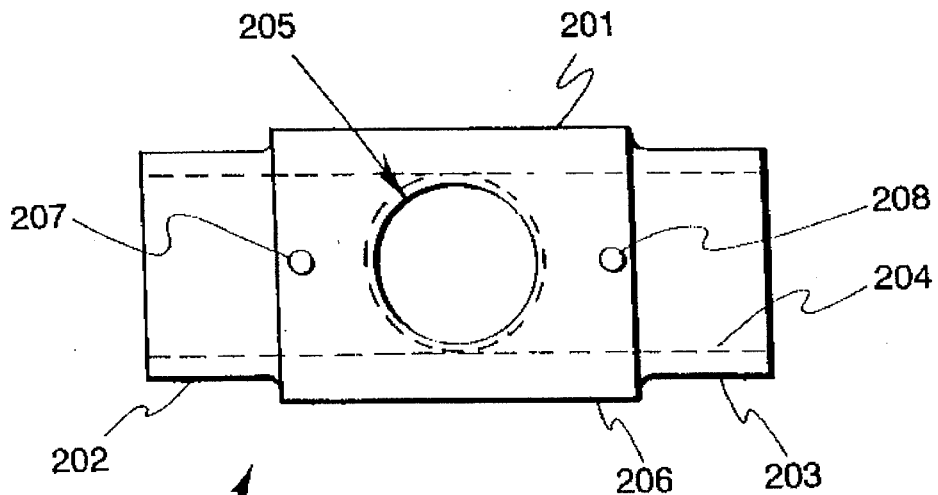
FIG. 30 is a top plan view of a T connector used in the vacuum manifold conduit assembly of the smokeless ashtray system of the present invention.
Figure 31:
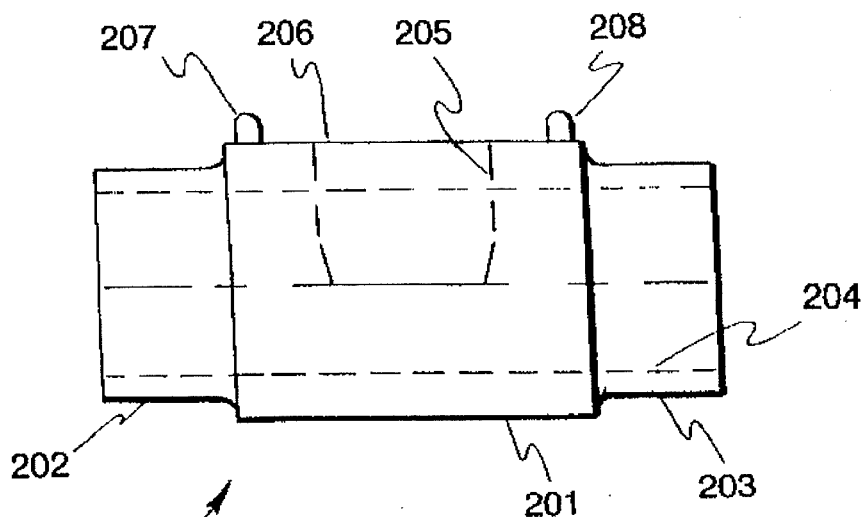
FIG. 31 is a side elevational view of the T connector used in the vacuum manifold conduit assembly of the smokeless ashtray system of the present invention.
Figure 32:
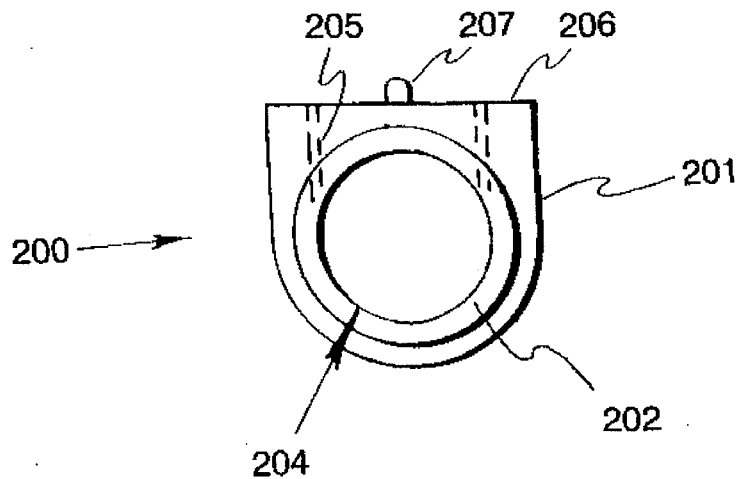
FIG. 32 is an end elevational view of the T connector used in the vacuum manifold conduit assembly of the smokeless ashtray system of the present invention.

FIGS. 30–32 illustrate the construction details of the four T connectors 200 which each include a body 201 having a lower semi-cylindrical portion and an upper rectangular portion having a flat top surface 206. Oppositely directed aligned cylindrical coupling legs 202 and 203 include a cylindrical passage 204 which perpendicularly intersects a threaded aperture 205 extending downwardly through the flat top surface 206. A pair of alignment protuberances or pins 207 and 208 project upwardly from the flat surface 156 on opposite sides of the bore 155 for a purpose described hereinafter. The pins 207 and 208 terminate in hemispherical top surfaces. The T connectors 200 thus essentially provide for the connection of ashtrays at intermediate locations along the manifold, in a series-type arrangement.

Figure 33:
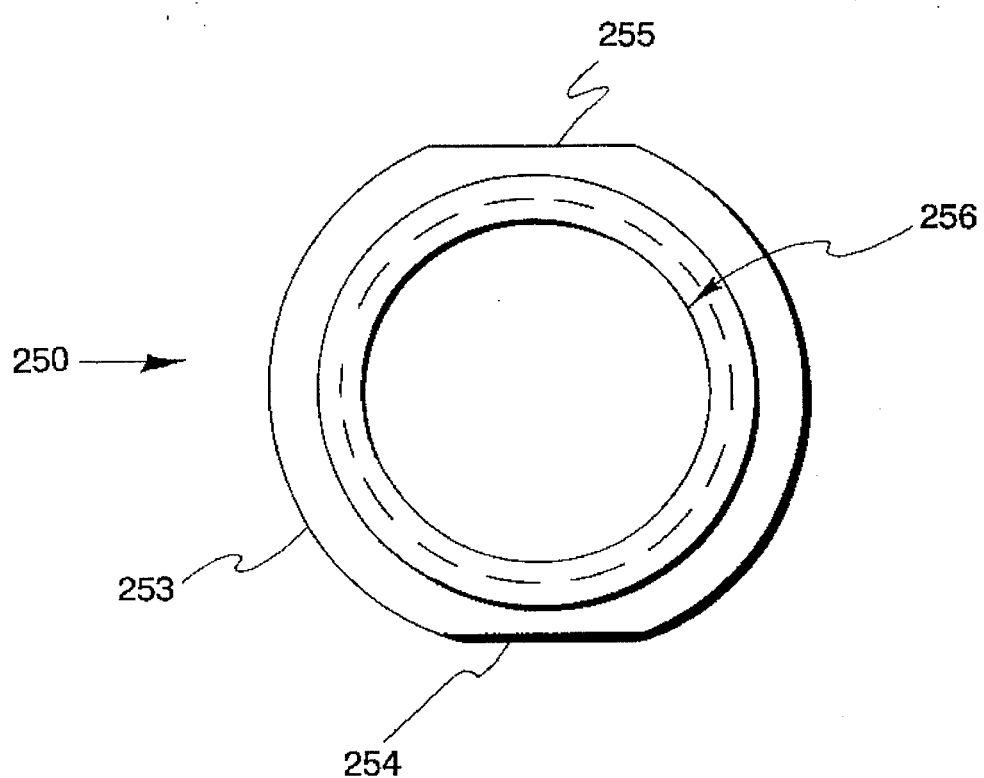
FIG. 33 is a top plan view of a flue member used in the vacuum manifold conduit assembly of the smokeless ashtray system of the present invention.
Figure 34:
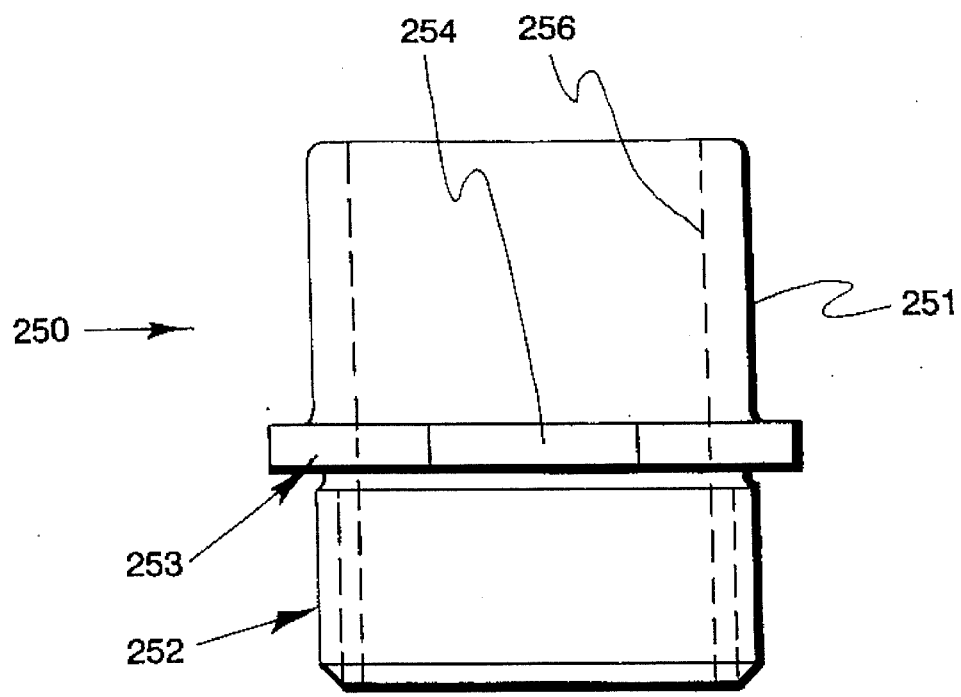
FIG. 34 is a side elevational view of the flue member used in the vacuum manifold conduit assembly of the smokeless ashtray system of the present invention.

FIGS. 33 and 34 illustrate the flue member 250, of which seven are employed in the illustrated seven ashtray system. Each of the flue members 250 includes an upper cylindrical portion 251 and a lower externally threaded portion 252 separated by a radial flange 253 provided with a pair of diametrically opposed wrench flats 254 and 255. A central cylindrical passage 256 extends entirely through the flue member 250.

Each of the connects 110, 150, 200, and the flue member 250 may be machined from a metal material such as aluminum, or preferably molded from a phenolic plastic material.

FIGS. 35 and 36 illustrate an example one of the connector mounting brackets 300 utilized to secure each of the conduit connectors 110, 150, and 200 to the underside of the table T or other mounting surface. The bracket 300 preferably comprises a flat strip of aluminum bent to provide a central body 301 offset vertically from opposite mounting flanges 309 and 310 by parallel legs 305 and 306 connected by respective right angle bends 307, 308 and 303, 304. A plurality of apertures 311, 313, 314, and 312 are formed centrally on a common center line through the bracket 300 for purposes described hereinafter.

With reference now again to FIG. 5, the manner of connecting and securing a connector at an ashtray location will now be described in detail. A properly selected one of the connectors 110, 150, or 200 is employed at each ashtray location. In the case of end most ashtray locations in the manifold, L connectors 110 are utilized. At intermediate locations, T connectors 200 are used. At the central ashtray location in the manifold, the four-way connector 150 is employed. In FIG. 5, an intermediate ashtray location is illustrated in conjunction with a T connector 200. One of the brackets 300 is positioned on the flat upper face 206 of the connector 200, such that the central hole 302 (FIG. 35) in the bracket 300 overlies the threaded bore 205 in the connector 200, with pins 207 and 208 received through bracket apertures 313 and 314. The lower threaded portion of a flue member 250 is then passed through the bracket hole 302 and screwed into the bore 205 of the connector 200, thus clamping the bracket portion 301 between the flange 253 and the flat top surface 206 of the connector 200. The bracket mounting flanges 309 and 310 are then secured to the underside of the table T by screws 315 and 316 extending through the flange apertures 311 and 312. (FIG. 35). In order to ensure central alignment, the ashtray 12 is preferably first inserted through the hole 13 in the table T, and the upper cylindrical portion 251 of the flue member 250 engaged within the recess 27 in the bottom of the ashtray 12 prior to securement of the bracket 300 in position using screws 315 and 316.

After completion of the above installation steps at each ashtray location, using the appropriate ones of the connectors 110, 150, and 200, the conduit segments 350 may be connected to the leg portions, for example 202 and 203 in FIG. 5, using an appropriate length of the heat shrink tubing 355 (FIG. 1), which may also be provided in a plurality of pre-cut pieces.

The charcoal filter 380 is a generally conventional item, employing powdered charcoal disposed in a canister between screen end plates. Filter charcoal of the grade known commercially as #612 coconut hull carbon is preferred. Preferably, the charcoal filter 380 includes a disposable filter element replaceably disposed in a suitable housing. The vacuum motor 420 preferably comprises a brushless 12 VDC motor and a rotary blower assembly capable of providing a 10 to 15 cubic feet per minute airflow through the system. The motor 420 and the filter assembly 380 may be enclosed in an insulated housing in order to dampen sound and vibration created by airflow through the system and motor operation. A conventional 120 VAC input and 12 VDC output power supply 480 provides 12 VDC power to the motor in a conventional manner. To provide simple on/off control, power on indication, and visual service required indication, a control box 500 is connected between the power supply 480 and the motor 420 using a quick connect wiring harness 490.

Figure 39:
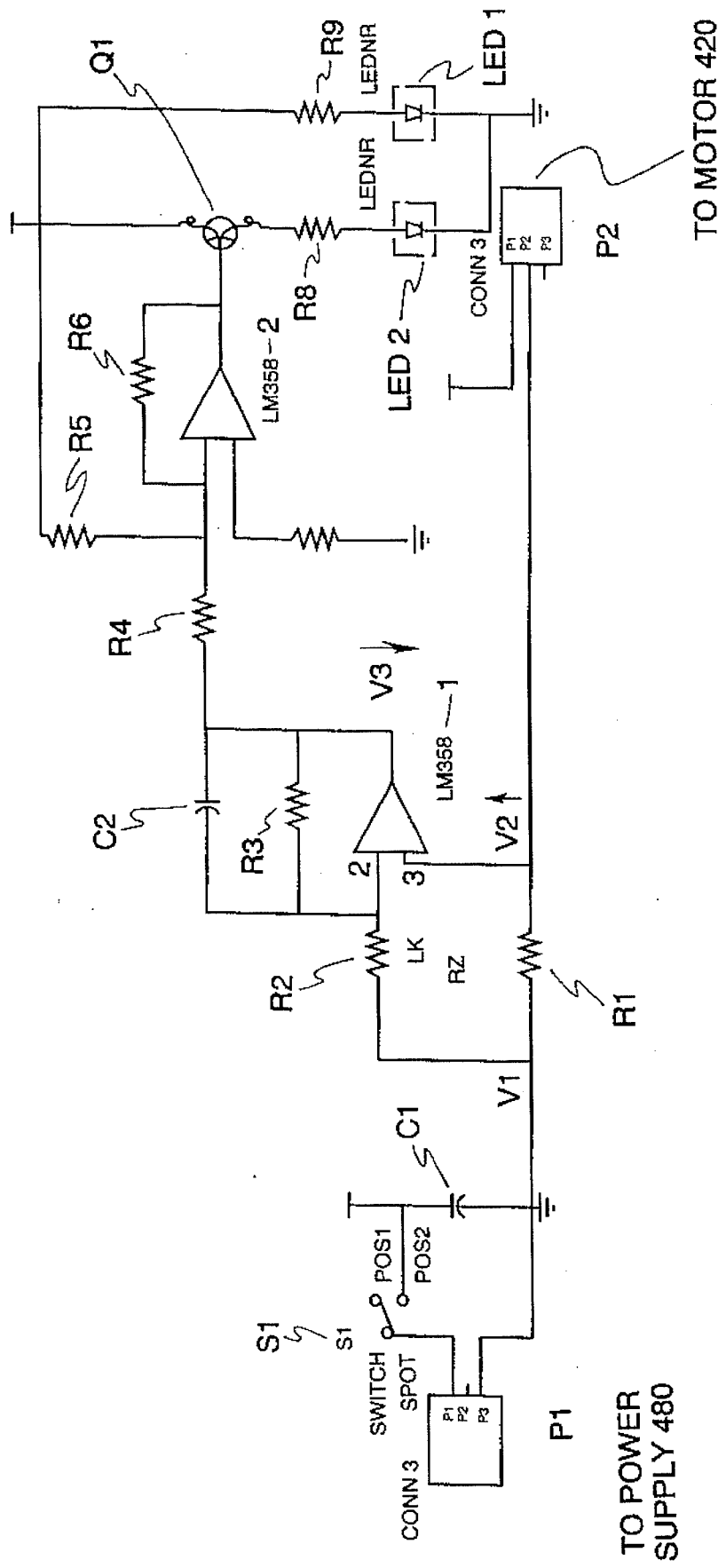
FIG. 39 is a schematic diagram of an electrical system for monitoring the amount of current drawn by the vacuum blower motor of the smokeless ashtray system of the present invention in order to provide an indication of a need for service.

FIG. 39 is a schematic diagram illustrating a printed circuit board and the electrical components of the control box 500. A first connector P1 is connected to the 12 VDC output of the power supply 480. A second connector P2 is connected to the motor 420. An ON/OFF switch S1 is operative to selectively open and close the circuit. In the ON or closed position of the switch S1, a green LED 1, visible on an external surface of the control box 500, is illuminated to provide a visual POWER ON indication. The circuit also monitors the current or amperage drawn by the motor 420 in order to provide a visual indication of a need for servicing the system when one or more of the filters 28 or 380 become significantly clogged. In particular, the current drawn or load on the motor 420 will decrease when the filters 28 and 380 become clogged, due to the decrease in the amount of air contacting the blades or vanes of the blower driven by the motor 420. Motor load monitoring is accomplished by using a first operational amplifier LM358-1 to detect the voltage drop across a resistor R1 of known impedance connected in series with the motor 420. Since the voltage drop across a resistor is related to the current through the resistor by the well known formula V=IR, the voltage drop across the resistor R1 indicates the load on the motor 420. The voltages V1 and V2 on opposite ends of the resistor R1 are connected to the input pins of the operational amplifier LM358-1. As the filters clog, the current drawn by the motor will decrease, causing the voltage drop V1–V2 across the resistor R1 to also decrease. This means that V2 will increase, causing V3 at the output pin of the operational amplifier LM358-1 to decrease. In order to filter transient current surges inherent in the normal operation of a motor, particularly a brushless DC motor, a capacitor C2 and resistor R3 are connected in parallel with the operational amplifier LM358-1 to form an integrating circuit. The decreased voltage V3 in turn causes a second operational amplifier LM358-2 to bias a transistor Q1, which acts as a switch, "ON" thus allowing current flow through a red LED 2, providing a visual "service needed" indication. As is well known, an LM358 is an integrated circuit chip containing two operational amplifiers on a common chip. The following table provides further details of the various circuit components.

| REFERENCE | PART # | DESCRIPTION | MANUFACTURER |
| --- | --- | --- | --- |
| R1 | SC1A0.1 | WW, 1 W, 1%, 0.1 Ohm | CLAROSTAT |
| R2, R8, R9 | 1KQTR-ND | Carbon, 1/4 W, 5%, 1K | YAEGO |
| R3, R4, R7 | 20KQTR-ND | Carbon, 1/4 W, 5%, 20K | YAEGO |
| R5 | 47-KQTR-ND | Carbon, 1/4 W, 5%, 47K | YAEGO |
| R6 | 100KQTR-ND | Carbon, 1/4 W, 5%, 100K | YAEGO |
| LED 1 | 5300H1 | Led, T1, 3/4, 90 Deg, Red | IDI |
| LED 2 | 5300H5 | Led, T1, 3/4, 90 Deg, Red | IDI |
| C1 | ECE-A1EU101 | 100 uf, 25 v, SU series | PANASONIC |
| C2 | ECE-A25Z4R7 | 4.7 uf, 25 v, Z series | PANASONIC |
| P1, P2 | 39-30-3036 | Housing, 3 Pos | MOLEX |
| Q1 | 2N2222A | Transistor | |
| LM358-1, -2 | | Opamp, 8 pin dip | |

The present system thus provides an easily installed and maintained smokless ashtry system, entirely fireproof, with a two-step filter system. The second stage charcoal filter unit 380 functions to remove smoking odors, and has a relatively long service life due to the pre-filtering operation of coalescing filter elements 28.

It is to be understood, however, that even though numerous characteristics and advantages of the present invention have been set forth in the foregoing description, together with details of the structure and function of the invention, the disclosure is illustrative only, and changes may be made in detail, especially in matters of materials, shape, size and arrangement of parts within the principles of the invention to the full extent indicated by the broad general meaning of the terms in which the appended claims are expressed.

What is claimed is:

1. A smokeless ashtray system, comprising:

at least one ashtray;

an upstanding chimney in said ashtray;

a recess in a bottom surface of said ashtray in fluid communication with said chimney;

a flue member removeably inserted in said recess and in fluid communication with said chimney; and a vacuum manifold connecting said flue member to a filter and vacuum source for suctioning smoke out of said ashtray through said flue member.

2. The smokeless ashtray system of claim 1, further comprising a shield in said ashtray to inhibit ashes and debris from passing into said chimney.

3. The smokeless ashtray system of claim 2, wherein said shield comprises a dome-shaped member.

4. The smokeless ashtray system of claim 2, wherein said shield is disposed sufficiently above an open upper end of said chimney to allow passage of air and smoke under said shield and into said chimney.

5. The smokeless ashtray system of claim 2, further comprising at least one air vent aperture in said shield for allowing air flow into said chimney.

6. The smokeless ashtray system of claim 1, further comprising a filter element in said flue member.

7. The smokeless ashtray system of claim 6, wherein said filter element includes an open upper end cap and a closed lower end cap and said filter element is smaller than internal dimensions of said flue member such that air and smoke pass through said open upper end cap, through side wall portions of said filter element, and through a space between outer side wall portions of said filter element and inner side wall portions of said flue member.

8. The smokeless ashtray system of claim 6, wherein said filter element includes an upper end cap having an air passage therethrough dimensioned and disposed for abutment with a seal face on a bottom surface of said ashtray surrounding said recess.

9. The smokeless ashtray system of claim 1, wherein said vacuum manifold comprises spiral wound flexible metal tubing.

10. The smokeless ashtray system of claim 1, wherein said vacuum manifold comprises at least one connector, said connector having a flat upper surface with at least one upstanding alignment protuberance, and a bracket configured for engagement with said alignment protuberance for securing said connector to an intended mounting surface.

11. The smokeless ashtray system of claim 10, wherein said flue member includes a flange portion dimensioned and disposed for clamping said bracket to said connector.

12. The smokeless ashtray system of claim 1, wherein said vacuum manifold comprises at least one flexible conduit segment, at least one connector, and heat shrink tubing securing said conduit segment to said connector.

13. The smokeless ashtray system of claim 1, wherein said vacuum source includes a motor and further comprising a control system connected to said motor and monitoring current drawn by the motor to provide an indication of filter clogging.

14. The smokeless ashtray system of claim 1, wherein said ashtray includes an upper outwardly extending flange, and further comprising a trim ring receiving said ashtray therethrough and dimensioned for abutment with said flange.

15. The smokeless ashtray system of claim 1, further comprising a cover assembly for said ashtray, said cover assembly including:

a screen for supporting cigars and cigarettes and including a plurality of apertures for the passage of ashes into said ashtray;

a cover plate overlying said screen and including a first window; and a slide plate movably mounted to said cover plate and including a second window selectively movable into and out of registry with said first window for opening and closing said ashtray.

16. A smokeless ashtray system, comprising:

a plurality of ashtrays;

means creating a passage through each of said ashtrays for the passage of smoke;

means for preventing ashes and other debris from entering said passage;

means connecting each of said ashtrays in a common manifold;

means for creating a vacuum in said common manifold; and means for filtering smoke from air passing through said manifold.

17. The smokeless ashtray system of claim 16, further comprising means for covering each of said ashtrays including means for selectively at least partially restricting air flow through each of said ashtrays.

18. An ashtray for connection to a vacuum source, comprising:

a substantially hollow body including an at least partially open upper end for receipt of cigars and cigarettes;

an upstanding chimney in said body including an air passage therethrough;

said chimney opening downwardly through a floor of said body for connection to a vacuum source; and a shield in said body for inhibiting the entrance of ashes and debris into said chimney.

19. The ashtray of claim 18, wherein said shield at least partially overlies an open upper end of said chimney.

20. The ashtray of claim 19, wherein said shield comprises a dome-shaped member.

* * * * *